United States Patent [19]

Cheng et al.

[11] Patent Number: 5,757,099
[45] Date of Patent: May 26, 1998

[54] HYBRID PARALLEL ACTIVE/PASSIVE FILTER SYSTEM WITH DYNAMICALLY VARIABLE INDUCTANCE

[75] Inventors: Po-Tai Cheng; Subhashish Bhattacharya; Deepakraj M. Divan, all of Madison, Wis.

[73] Assignee: Wisconsin Alumni Research Foundation, Madison, Wis.

[21] Appl. No.: 609,445

[22] Filed: Mar. 1, 1996

[51] Int. Cl.⁶ .................................................. H02J 3/01
[52] U.S. Cl. .................................... 307/105; 333/173
[58] Field of Search ........................ 307/105; 363/39–41, 363/44; 333/12, 167, 170–177; 327/532; 323/205, 207–211

[56] References Cited

U.S. PATENT DOCUMENTS

| | | | |
|---|---|---|---|
| 4,053,820 | 10/1977 | Peterson et al. | 363/44 |
| 5,198,746 | 3/1993 | Gyugyi et al. | 323/207 |
| 5,329,222 | 7/1994 | Gyugyi et al. | 323/207 |
| 5,355,025 | 10/1994 | Moran et al. | 307/105 |
| 5,465,203 | 11/1995 | Bhattacharya et al. | 323/207 |
| 5,513,090 | 4/1996 | Bhattacharya et al. | 307/105 |

OTHER PUBLICATIONS

S. Bhattacharya, et al., "Synchronous Frame Harmonic Isolator Using Active Series Filter", EPE' 91 Conf. Rec., vol. 3, pp. 30–35, Florence, 1991.

S. Bhattacharya, et al., "Active Filter Solutions for Utility Interface", IEEE–ISIE Conf. Rec., pp. 53–63, 1995.

Subhashish Bhattacharya & Deepak Divan, "Design and Implementation of a Hybrid Series Active Filter System", IEE PESC Conf. Rec., pp. 189–195, 1995.

L. Gyugyi & E.C. Strycula, "Active Power Filters", IEEE–IAS Conf. Rec., pp. 529–535, 1976.

N. Mohan, et al., "Active Filters for AC Harmonic Suppression", IEEE/PES Winter Power Meeting, pp. 168–174, 1977.

I. Takahashi & A. Nabae, "Universal Power Distortion Compensator of Line Commutated Thyristor Converter", Proc. IEEE/IAS Annu. Meeting, pp. 858–864, 1980.

Hirofumi Akagi, et al., "Instantaneous Reactive Power Compensators Comprising Switching Devices without Energy Storage Components", IEEE Trans. Indus. App., vol. IA–20, No. 3, pp. 625–630, 1984.

D.M. Divan, "Non Dissipative Switched Networks for High Power Applications", Electronics Letters, vol. 20, No. 7, pp. 277–279, Mar. 1984.

(List continued on next page.)

*Primary Examiner*—Richard T. Elms
*Attorney, Agent, or Firm*—Foley & Lardner

[57] ABSTRACT

A parallel hybrid active filter system for harmonic compensation of large non-linear loads is provided. The hybrid filter includes a passive filter connected in series with an inverter that is controlled to produce a dynamically variable inductance at selected harmonic frequencies. The passive filter may include passive capacitive and inductive elements, or may include a power factor correction capacitor alone, with all the inductance for the hybrid filter provided by the active filter inverter. The active filter inverter is controlled to provide the dynamically variable inductance by a synchronous reference frame (SRF) based controller that generates active filter inverter voltage commands that are fed to a PWM or square wave modulated voltage source inverter (VSI). The SRF controller includes an inductance command generator that generates the inductance value necessary to provide harmonic compensation from measured three phase load and filter currents transformed into a two phase synchronous rotating reference frame. A single inverter may be controlled to implement variable inductances for compensation of multiple harmonic frequencies by superposition of active filter inverter voltage commands from multiple SRF controllers. The active filter inverter is also preferably controlled by a SRF based DC bus controller to provide for maintenance of a DC bus voltage providing power to the inverter without affecting the harmonic compensation of the hybrid filter.

46 Claims, 23 Drawing Sheets

OTHER PUBLICATIONS

F.Z. Peng, et al., "A New Approach to Harmonic Compensation in Power Systems", IEEE-IAS Conf. Rec., pp. 874–880, 1988.

Hideaki Fujita & Hirofumi Akagi, "A Practical Approach to Harmonic Compensation in Power Systems—Series Connection of Passive and Active Filters–", IEEE-IAS Conf. Rec., pp. 1107–1112, 1990.

N. Balbo, et al., "Hybrid Active Filter for Parallel Harmonic Compensation".

Isao Takahashi, et al., "Low Price and High Power Active Filter", IEEE Japan National Convention, pp. E95-E98, 1991.

Hirohito Funato & Atsuo Kawamura, "Proposal of Variable Active-Passive Reactance", IEEE IECON Conf. Rec., vol. 1, pp. 381–388, 1992.

Hirohito Funato & Atsuo Kawamura, "Analysis of Variable Active-Passive Reactance", IEEE PCC Conf. Rec., pp. 647–652, 1993.

Subhashish Bhattacharya, et al., "Control and Reduction of Terminal Voltage Total Harmonic Distortion (THD) in a Hybrid Series Active and Parallel Passive Filter System", IEEE PESC Conf. Rec., pp. 779–786, 1993.

Hirohito Funato & Atsuo Kawamura, "Control of Variable Active-Passive Reactance (VAPAR) and Negative Inductance", IEEE PESC Conf. Rec., pp. 189–196, 1994.

H. Akagi, "New Trends in Active Filters", EPE '91 Conf. Rec., vol. O, pp. 017–026, 1995.

Mukul Rastogi, et al., "Hybrid-Active Filtering of Harmonic Currents in Power Systems", presented at the 1995 IEE/PES Winter Meeting, New York, New York, Jan. 29–Feb. 2, 1995.

Ned Mohan & Girish R. Kamath, "A Novel, Per-Phase Interface of Power Electronic Apparatus for Power System Applications", presented at NAPS 95, Bozeman, Montana, 1995.

J. Häfner, et al., "A Combined System of a Passive Filter and a Shunt Active Power Filter to Reduce Line Current Harmonics", Proc. 1995 IPEC, Yokohama, Japan, pp. 388–393, 1995.

S. Bhattacharya, et al., "Optimizing Three Phase Current Regulators for Low Inductance Loads", IEEE-IAS Conf. Rec., pp. 2357–2364, 1995.

Subhashish Bhattacharya & Deepak Divan, "Synchronous Frame Based Controller Implementation for a Hybrid Series Active Filter System", IEEE-IAS Conf. Rec., pp. 2531–2540, 1995.

$F_q^s = F_a$ $F_d^s = \frac{-1}{\sqrt{3}} F_a - \frac{2}{\sqrt{3}} F_b$ $$\begin{vmatrix} F_q^e \\ F_d^e \end{vmatrix} = \begin{vmatrix} \cos\theta & -\sin\theta \\ \sin\theta & \cos\theta \end{vmatrix} \begin{vmatrix} F_q^s \\ F_d^s \end{vmatrix}$$

VECTOR ROTATION EQUATIONS $\hat{F}_{qd} = \varepsilon^{-j\theta} \hat{F}^s_{qd}$ WHERE $\hat{F}_{qd} = F_q - jF_d$ $\hat{F}^s_{qd} = F^s_q - jF^s_d$ $$\begin{vmatrix} F_q^s \\ F_d^s \end{vmatrix} = \begin{vmatrix} \cos\theta & \sin\theta \\ -\sin\theta & \cos\theta \end{vmatrix} \begin{vmatrix} F_q \\ F_d \end{vmatrix}$$

$$F_a = F_q$$
$$F_b = \frac{-1}{2}F_q - \frac{\sqrt{3}}{2}F_d$$
$$F_c = -F_a - F_b$$

VECTOR ROTATION $$\hat{F}^s_{qd} = \varepsilon^{j\theta}\hat{F}_{qd}$$

WHERE $$\hat{F}_{qd} = F_q - jF_d$$

$$\hat{F}^s_{qd} = F^s_q - jF^s_d$$

HYBRID PARALLEL ACTIVE/PASSIVE FILTER SYSTEM WITH DYNAMICALLY VARIABLE INDUCTANCE

This invention was made with United States Government support awarded by ONR Award No. CR-4715-430620. The United States Government has certain rights in this invention.

FIELD OF THE INVENTION

This invention pertains generally to power conditioning devices and methods which produce low distortion terminal voltage and supply current harmonics, and more particularly to hybrid parallel active/passive filter systems employed for harmonic compensation of large non-linear loads.

BACKGROUND OF THE INVENTION

The proliferation of certain power electronic loads, such as three phase diode and thyristor bridge inverters used in DC power supplies, adjustable speed drives (ASDs), and Uninterruptible Power Supplies (UPS), has brought power utilities to a crossroad. These non-linear loads cause harmonic distortion in the power supply lines, typically due to the front-end or input rectifier operation, that generates transient and spurious frequencies in the power signal. Thus, utilities frequently encounter harmonic related problems, including substantially higher transformer and line losses. The reactive power and harmonic current in the supply caused by these loads requires derating of distribution equipment. Power supply voltage distortion can also result in severe harmonic interactions and resonance problems between customers, or between the utility and the load. Power supply voltage distortion also reduces system stability and safe operating margins. To alleviate harmonic related problems, utilities are beginning to implement recommended harmonic standards, such as IEEE 519. IEEE 519 is a customer-utility point of common coupling (PCC) specification, not an equipment specification.

Passive filters, composed of passive capacitors and inductors, have traditionally been used to absorb harmonic distortion generated by large industrial loads. Passive filters can provide harmonic filtering at the load, i.e., at the source of harmonics, to reduce voltage distortion at the load terminals, and/or they can be installed at power distribution substations, to provide both harmonic filtering and reactive power correction for the entire power system substation load. Installation at power distribution substations has the advantage of one point installation, but results in higher voltage distortion. Passive filters are favored because of their low cost and high efficiency. However, they have several drawbacks. Passive filters are highly susceptible to undesirable series and parallel resonances with the supply and load, respectively. Passive filters are also susceptible to load and line switching transients. Most significantly, passive filters are sensitive to L-C component tolerances. Since the L-C components which form the passive filter have typically ±10% L and C component tolerances, passive filters are usually mis-tuned, which defeats their very purpose as harmonic sinks. Power supply system impedances strongly influence the compensation characteristics of passive filters. It is particularly difficult to design passive filters, with sharp tuning and high quality (Q) factors to absorb a significant percentage of load harmonic currents, for industrial non-linear loads connected to stiff utility power supplies. Stiff utility power supplies are characterized by low supply inductances, requiring a passive filter with a lower impedance than the supply to sink a significant portion of load harmonic currents Hence, the effectiveness of passive filters reduces for stiff power supply systems. Tuned passive filters are susceptible to being overloaded due to ambient harmonic loads and/or supply voltage distortions. Thus, passive filters are often intentionally off-tuned to avoid being overloaded due to ambient harmonic loads, supply voltage distortions, and resonance problems. Effective passive filter designs thus require extensive system studies and engineering effort. These efforts are typically justified only for high voltage transmission systems, for which detailed system studies are invariably done, and for which engineering cost is only a small fraction of the total system cost.

Active filters were developed to mitigate the drawbacks of passive filters. Active filters typically employ an inverter, connected in series or parallel with the power supply lines, to provide the harmonic filtering function. Harmonic filtering may be accomplished using active filters alone, such as active filters connected in parallel or series between the power supply and the load, or in combination with passive filters. A harmonic filtering solution employing both active and passive filters is known as a hybrid active filter solution. The optimal active filter solution is application and utility interface specific, and hence requires a systems approach to its design. For example, parallel active filters usually require an inverter with a large kVA rating and high bandwidth, and hence do not constitute a cost-effective harmonic filtering solution for non-linear loads above 1 MVA.

Increasing enforcement of harmonic standards, such as IEEE 519, by utilities, especially for large industrial customers, has perpetrated the need for cost-effective active filters. As a result, viable and cost-effective hybrid active filter topologies have been developed which use small rated active filters (rated at <5% of load power) in combination with passive filters. Hybrid active filters may be connected so that the passive portion of the hybrid filter is connected in parallel or series with the load and source, with the active portion of the filter connected in the opposite, series or parallel, relation with the load and source. Hybrid active filters improve the compensation characteristics of the passive filters, making possible a reduction in the active filter rating.

Hybrid active filters effectively mitigate the drawbacks of both active and passive filters alone, and offer the possibility of several additional value-added features, which increase their practical viability. The value added features of hybrid active filters include line voltage regulation, reactive power compensation, and harmonic isolation. A hybrid active filter may be employed to perform any of these functions besides, or simultaneously with, harmonic compensation. More detailed descriptions of hybrid active filters, including descriptions of the use of hybrid active filters to perform the value added features mentioned, may be found in: I. Takahashi & A. Nabae, "Universal Power Distortion Compensator of Line Commutated Thyristor Converter", Proc. IEEE/IAS Annu. Meeting, pp. 858–864, 1980; F. Z. Peng, et al., "A New Approach to Harmonic Compensation in Power Systems", IEEE-IAS Conf. Record, 1988, pp. 874–880; Hideaki Fujita and Hirofumi Akagi, "A Practical Approach to Harmonic Compensation in Power Systems—Series Connection of Passive and Active Filters"s, IEEE-IAS Conf. Record, 1990, pp. 1107–1112; Isao Takahashi, et al., "Low Price and High Power Active Filter", IEE/IAS National Convention, Japan, 1991, pp. E95–E98; D. M. Divan, "Non Dissipative Switched Networks for High Power Applications", Electronics Letters, vol. 20, no. 7, pp. 277–279, March 1984; Hirohito Funato & Atsuo Kawamura, "Proposal of Variable Active-Passive Reactance", IEEE IECON Conf. Record, 1992, vol. 1, pp. 381–388; Hirohito Funato & Atsuo Kawamura, "Analysis of Variable Active-Passive Reactance", IEEE PCC Conf. Record, Yokohama, 1993, pp. 647–652; Hirohito Funato & Atsuo Kawamura, "Control of Variable Active-Passive Reactance (VAPAR) and Negative Inductance", IEEE PESC Conf. Record, 1994, pp. 189–196; U.S. Pat. No. 5,198,746 to L. Gyugyi, et al., entitled "Transmission Line Dynamic Impedance Compensation System"; and U.S. Pat. No. 5,465,203 to Bhattacharya, et al., entitled "Hybrid Series Active/Parallel Passive Power Line Conditioner with Controlled Harmonic Injection."

Control of active filter inverters in hybrid active filters is often accomplished using a synchronous reference frame (SRF) based controller. An SRF based controller typically receives measured voltages or currents in the three phase a-b-c reference frame as inputs, and transforms the three phase quantities into a synchronously rotating two phase d-q reference frame. The inverter control signals are then initially generated in the two phase synchronous reference frame, and then converted back to the three phase reference frame and applied to control the inverter.

The transformation from a three phase reference frame to a synchronously rotating two phase reference frame is illustrated in FIG. 1. For exemplification purposes, the three phase quantities may be three phase currents $i_a$, $i_b$ and $i_c$.

The transformation of the three phase currents $i_a$, $i_b$, and $i_c$ into synchronously rotating two phase currents $i^e_q$ and $i^e_d$ is a two step process. First, the three phase currents are transformed to a two phase ds-qs reference frame that is stationary with respect to the three phase system. This three phase to two phase stationary transformation is equivalent to a set of linear equations with constant coefficients, as shown in FIG. 1. The two phase stationary currents $i^s_q$ and $i^s_d$ are vectors that are 90° out of phase with each other and stationary with respect to the three phase current vectors $i_a$, $i_b$ and $i_c$. This three phase to stationary two phase transformation may be accomplished by a conventional three phase to two phase transformer 20 which executes the following equation:

$$\begin{bmatrix} i_q^s \\ i_d^s \end{bmatrix} = k_1 \begin{bmatrix} 1 & -1/2 & -1/2 \\ 0 & -\sqrt{3/2} & \sqrt{3/2} \end{bmatrix} \begin{bmatrix} i_a \\ i_b \\ i_c \end{bmatrix}, \quad (1)$$

where k is a constant equal to $\sqrt{2/3}$. The second step of the three phase to two phase synchronous reference frame transformation 21 is the transformation of the stationary two phase reference frame quantities ds and qs into synchronous rotating reference frame quantities de and qe. This is achieved by multiplying the stationary reference frame values ds and qs by unit vectors cosθ and sinθ. Transformation from the stationary to rotating two phase reference frame is accomplished by execution of the following equation:

$$\begin{bmatrix} i_q^e \\ i_d^e \end{bmatrix} = \begin{bmatrix} \cos\theta_n & -\sin\theta_n \\ \sin\theta_n & \cos\theta_n \end{bmatrix} \begin{bmatrix} i_q^s \\ i_d^s \end{bmatrix}. \quad (2)$$

The rotation transformation is often referred to as a "vector rotation", since the d-q quantities can be combined as a vector, and the transformation then amounts to the rotation of one vector with respect to another. FIG. 1 includes the vector rotation equations.

The unit vectors cosθ and sinθ are obtained from a phase-locked loop (PLL). An exemplary prior art PLL is illustrated at 22 in FIG. 2. The PLL obtains an instantaneous vector sum of the three phase input voltages ($V_{ia}$, $V_{ib}$ and $V_{ic}$) by using a three-to-two phase transformer 23 that generates signals $V_{di}$ and $V_{qi}$. These signals are conveyed to a phase detector 24. The phase detector output may be defined as:

$$\sin(\text{phase error}) = V_{di} \cos\theta - V_{qi} \sin\theta \quad (3)$$

In Equation 3, sinθ and cosθ are the values presently pointed to in a lookup table 25. The phase detector 24 output is processed by a proportional plus integral (PI) controller 26 that provides fast response and zero steady-state tracking error. The PI controller 26 is what is used to determine the count parameter of a timer or digital oscillator 27. The timer count value is decremented from the count parameter value at a constant rate, when zero is reached, the sinθ and cosθ pointers in the lookup table 25 are incremented. Since this is a closed-loop system, the timer count value is either increased or decreased, depending on the PI controller 26 output, so as to reduce the phase error until a phase-locked condition is achieved.

The transformation from a synchronously rotating two phase de-qe reference frame to a three phase a-b-c reference frame is illustrated in FIG. 3. A rotating to stationary transformer 28 first transforms rotating two phase quantities, for example, voltages $v^e_d$ and $v^e_q$, to stationary two phase values using the equation:

$$\begin{bmatrix} V_{q^s} \\ V_{d^s} \end{bmatrix} = \begin{bmatrix} \cos\theta_n & \sin\theta_n \\ -\sin\theta_n & \cos\theta_n \end{bmatrix} \begin{bmatrix} V_{q^e} \\ V_{d^e} \end{bmatrix} \quad (4)$$

where cosθ and sinθ are derived from a PLL. The resulting stationary two phase values $V^s_d$ and $V^s_q$ are then transformed 29 to three phase voltage quantities using:

$$\begin{bmatrix} V_a \\ V_b \\ V_c \end{bmatrix} = k_1 \begin{bmatrix} 1 & 0 \\ -1/2 & -\sqrt{3/2} \\ -1/2 & \sqrt{3/2} \end{bmatrix} \begin{bmatrix} V_{q^s} \\ V_{d^s} \end{bmatrix}. \quad (5)$$

The equations for the two phase to three phase transformations are also presented in FIG. 3.

An exemplary modified SRF based controller for a series active filter in a hybrid filter system is described in Subhashish Bhattacharya, et al., "Control and Reduction of Terminal Voltage Total Harmonic Distortion (THD) in a Hybrid Series Active and Parallel Passive Filter System", IEEE PESC Conf. Record, 1993, pp. 779–786. The functions of an SRF based controller are also discussed in U.S. Pat. No. 5,465,203, mentioned above.

The concept that an inverter topology can be used as a Generalized Impedance Converter (GIC) or 'gyrator' to realize either a negative or positive inductance is known. This concept is based on the principle that an inverter can be treated as a two-port network that allows realization of any relationship between its terminal voltage and current by appropriately controlling the inverter switches. The synthesized voltage and current relationship can be either linear or non-linear, and is valid under both steady state and transient conditions. Negative inductance based fundamental series compensation systems and conventional variable reactance schemes are described in more detail in the papers by D. M. Divan and Funato & Kawamura, mentioned above.

SUMMARY OF THE INVENTION

The present invention provides a parallel hybrid active filter system for harmonic compensation of large non-linear loads. The hybrid active filter system of the present invention will allow a power supply customer to meet recommended harmonic standards, such as IEEE 519. The hybrid active filter of the present invention may be employed by single customers or groups of customers for multiple and diverse loads. Both harmonic and linear loads may be connected to the point of common coupling (PCC) where the hybrid filter of the present invention is connected to the power supply system. The presence of multiple and diverse loads justifies the application of hybrid active filters in general. Hybrid active filters are more suitable in multiple and diverse load applications.

The hybrid active filter of the present invention includes a passive filter connected in series with an active filter. The series combination of passive and active elements may then be connected in parallel with a non-linear or mixed load and the power supply at the PCC. The passive filter portion of the hybrid active filter includes passive capacitors and inductors. The active filter component of the hybrid active filter is controlled to inject an orthogonal voltage in series with the passive filter at a desired harmonic frequency, to thereby synthesize a dynamically variable inductance at the selected harmonic frequency. By controlling the active filter, and thus the dynamically variable inductance, at the selected frequency, the inductance of the entire hybrid passive and active filter at the selected frequency may be tuned to remove undesired harmonic current distortion and voltage distortion at the supply terminals that a non-linear load may place upon the power supply lines to which it is connected. The hybrid active filter system of the present invention may thus provide tuning for mis-tuned passive filter systems. The field tuning requirements of passive filters may thus be avoided. The hybrid active filter system of the present invention also preferably provides a filter current limiting function to prevent overload of the filter. Thus, all of the features of the hybrid active filter of the present invention may be achieved in the presence of power supply voltage distortion as well as ambient harmonic loads.

The dynamically variable inductance of the hybrid active filter of the present invention may be generated by an active filter implemented as an inverter connected in series with the passive filter elements. The inverter may be coupled to the passive filter elements either directly or via a coupling transformer. The inverter is controlled to synthesize the dynamically variable inductance to achieve the harmonic compensation and current limiting objectives mentioned above. A synchronous reference frame (SRF) based controller is preferably used to control the inverter to implement the desired dynamically varying, negative or positive, inductance at the selected harmonic frequency. A portion of the SRF controller generates a command signal representative of the desired active inductance component at a selected harmonic frequency. This active inductance command signal is used by the SRF controller to generate active filter inverter voltage command signals. The voltage command signals are fed to a pulse width modulator (PWM) or similar system for generating the required switching signals to drive the switches of a voltage source inverter (VSI) to synthesize the desired dynamically variable inductance in the hybrid active filter.

The SRF controller, including the inductance command signal generator, operates by measuring the active three-phase load and filter currents and transforming them into a synchronously rotating two-phase d-q reference frame, where the d-q components of the currents are at a 90° phase angle with respect to each other. This transformation is achieved, in part, using $\cos\theta_n$ and $\sin\theta_n$ unit vectors calculated at a desired frequency, and derived from a phase lock loop (PLL) on the terminal voltage of the hybrid active filter. The desired frequency is the selected harmonic frequency to be filtered. Thus, for the 5th harmonic, n=5. This reference frame transformation transforms the specified harmonic components of the filter and load currents to DC quantities that are extracted by low-pass filters (LPF). Extraction of the DC signal allows the specified harmonic components of interest to be determined without any phase sensitivity. This is a significant advantage of an SRF based controller. The active inductance command signal is derived from the difference between values corresponding to the magnitudes of the harmonic components in the load and filter currents. Phase information on the load and filter currents is not required. The value of the active inductance may also be calculated to limit the current in the hybrid filter to that required by recommended harmonic standards, such as IEEE 519. Limiting the current in the hybrid filter also prevents overloading of the filter circuit due to the presence of ambient harmonics and supply voltage distortions, and also functions to dampen resonances in the power supply system by limiting currents due to resonance conditions. The active filter inverter voltage command signals are, in turn, derived from the active inductance command signal by multiplying the active inductance command signal by a signal corresponding to a derivative of the filter current at the selected harmonic frequency. By taking advantage of the phase relationship between the voltage and current for an inductor at a single frequency, the signal corresponding to the derivative may be generated by interchanging the d-q reference frame current quantities and multiplying the d-q quantities by constants of equal magnitude and opposite sign to rotate the quantities by 90°, and multiplying by the selected harmonic frequency, rather than computing the derivative more directly. The resulting two-phase inverter voltage command signal is transformed into the three-phase active inverter voltage command signals before being provided to the inverter modulator. Conventional analog or analog/digital circuits may be used to perform the three phase to two phase and two phase to three phase transformation, to implement the PLL, and to perform LPF and other functions of the SRF controller. These functions may also be implemented digitally using a digital signal process (DSP)

The active filter inverter is preferably provided a steady voltage from a DC bus capacitor. The inverter is, therefore, also modulated to provide compensation to the DC bus to compensate for the losses of the inverter. The inverter is thus controlled to provide both the desired active inductance value in the hybrid active filter, and to maintain the required DC bus voltage. This is preferably accomplished using a SRF based DC bus controller that employs the filter current, the measured DC bus voltage, and a DC bus reference voltage to generate DC bus control inverter voltage command signals as an output. The output of the DC bus controller is combined with that of the SRF controller for the dynamically variable inductance to form combined active filter and DC bus control inverter voltage command signals that are applied to the inverter modulator.

The dynamically controlled active filter inductance of the present invention may be used to implement several parallel hybrid active/passive filter topologies in accordance with the present invention. A separate hybrid active filter may be employed for the filtering of each harmonic component of interest. For example, two separate hybrid active/passive filters may be used, one each for the $5^{th}$ and $7^{th}$ harmonic components of the load current. Alternatively, multi-tuned filter performance may be achieved using a single passive filter and dynamically controlled active inductance. For example, the inductors and capacitors of a passive filter may be tuned for the $5^{th}$ harmonic, with a series connected active filter in accordance with the present invention providing tuning at the $7^{th}$ harmonic frequency. Moreover, the use of the active filter dynamically variable inductance of the present invention allows the passive filter to be implemented as a power factor correction capacitor. The inductive elements of the hybrid active-passive filter are then provided by the inverter output or coupling transformer inductances and the dynamically variable active inductance produced by the inverter to tune the hybrid active filter to the desired harmonic frequency. The active filter inverter may be controlled to provide filtering at multiple harmonic frequencies simultaneously by adding the active filter inverter voltage command signals produced by separate SRF controllers for each selected harmonic frequency before applying the command signals to the inverter modulator. This superpositioning of active inductances is possible because the dynamically variable active inductances produced by the active filter inverter are generated only at the selected frequencies of interest.

Parallel hybrid active filters in accordance with the present invention offer a practically viable and cost-effective topology for harmonic and reactive power compensation of multiple and diverse non-linear and mixed linear and non-linear industrial loads. In a hybrid active filter topology in accordance with the present invention, the active filter components typically need only be rated at less than 3% of the load kVA rating. The dynamically variable inductance active filter of the present invention may be retrofited with existing L-C passive filters, or power factor correction capacitors, to provide a hybrid active filter topology. The hybrid active filter of the present invention can provide tuning for passive filters that are off-tuned (e.g., $4.7^{th}$ harmonic) or mis-tuned due to component tolerances. The hybrid active filter also permits passive filter designs to be made insensitive to supply line impedances. This allows passive filters to be tuned to dominant harmonic frequencies and enables their cost optimization. The hybrid active filter of the present invention is particularly suited for harmonic compensation of loads connected to stiff supply systems, since it makes possible the improvement of passive filter compensation characteristics. In stiff supply systems the supply inductance $L_s$ is very small. In such cases, for effective harmonic filtering, the passive filter impedance must be made substantially smaller than the supply impedance at the selected harmonic frequency to sink a significant portion of the load harmonic currents.

The concept and method of synthesizing a dynamically varying inductance by SRF based control of a VSI in accordance with the present invention also has potential application beyond harmonic compensation and filtering. For example, the dynamically varying inductance may be used to implement such features as line voltage regulation, reactive power compensation, and harmonic isolation, etc.

DETAILED DESCRIPTION OF THE INVENTION

Figure 4:
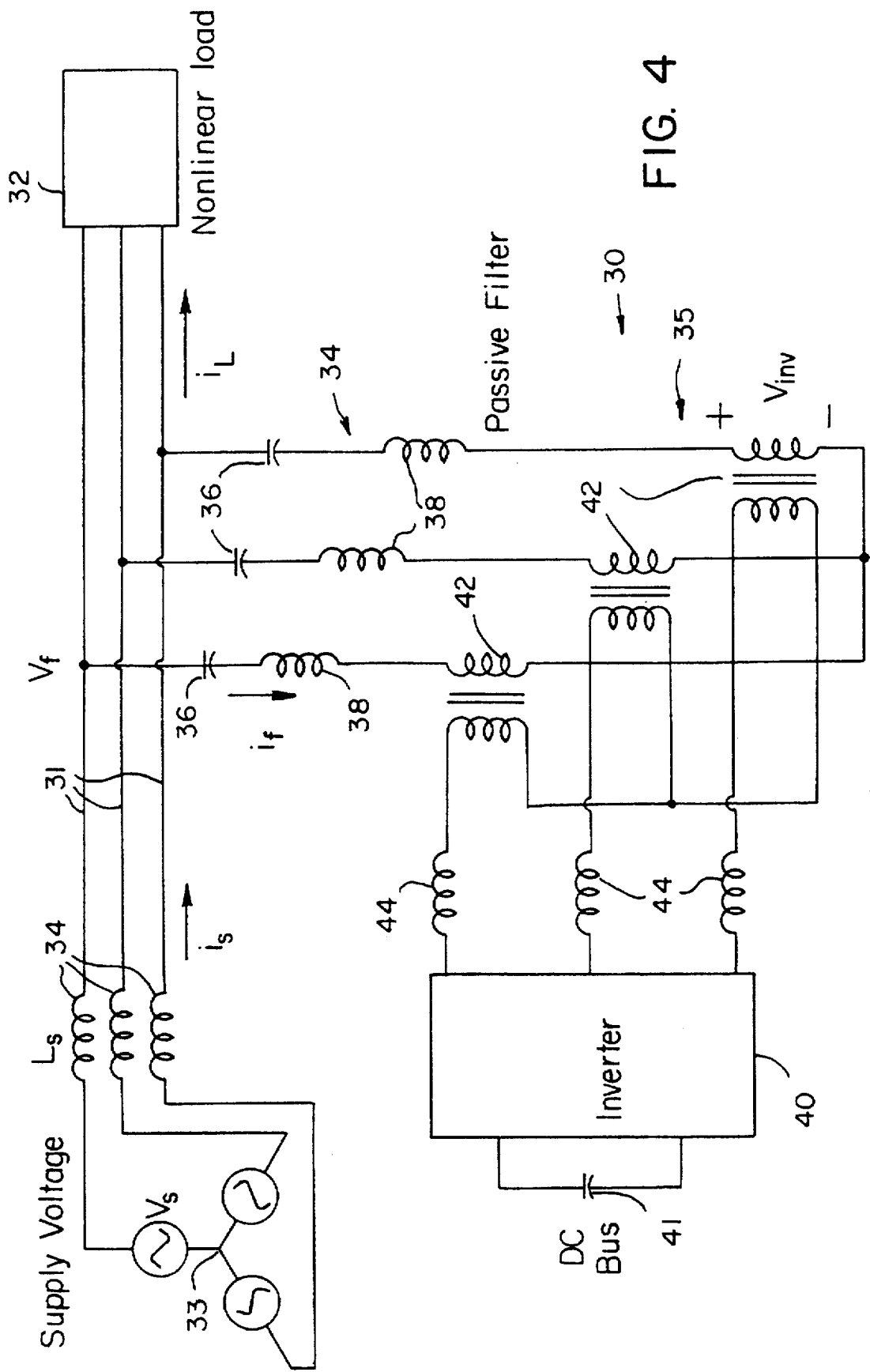
FIG. 4 is a schematic circuit diagram of a parallel hybrid active filter system in accordance with the present invention.

An exemplary parallel hybrid active filter system in accordance with the present invention is shown generally at 30 in FIG. 4. The hybrid filter 30 is connected to power supply lines 31 which connect a non-linear load 32, such as a load including thyristors or diode rectifiers, to a three phase supply voltage source 33, having source supply line and transformer inductances 34. The load 32 may also be a multiple and diverse mixed load including linear and non-linear loads connected to a point of common coupling (PCC). The hybrid filter 30 is connected in parallel with the load 32 and supply voltage 33 and includes a passive filter 34 connected in series with an active filter 35. The passive filter 32 typically includes passive capacitors 36 and inductors 38 connected to form a passive filter. The passive capacitors 36 and inductors 38 of the passive filter 34 are typically tuned close to the harmonic frequency to be filtered from the power lines 31. However, as discussed previously, variations in capacitor and inductor device tolerances typically result in mis-tuning of the passive filter 34, and the passive filter may be intentionally off-tuned (e.g., tuned to the $4.7^{th}$ for the $5^{th}$ harmonic) to prevent filter overload due to supply voltage distortions or ambient harmonics.

In accordance with the present invention, the active filter 35 provides a dynamically variable inductance, making possible fine tuning of the hybrid filter 30 to compensate for the harmonic distortion of the load 32. The active filter 35 injects an orthogonal voltage in series with the passive filter 34 at the selected harmonic frequency or frequencies. Thus, a dynamically variable active inductance is generated in the hybrid filter 30 at the selected frequency. The dynamically variable inductance is only generated at the selected frequency or frequencies, and may be different for different harmonic frequencies. The dynamically variable inductance thus does not exist at all frequencies, and it is in this sense that the term 'dynamically variable inductance' is used throughout this description.

The active filter 35 is preferably implemented using a three phase pulse width modulation (PWM) or square-wave voltage source inverter (VSI) 40 connected in series with the shunt passive filter 34. Other inverter topologies may also be employed, such as three single phase inverters with common or separate DC bus capacitors. The inverter 40 is preferably provided a steady voltage by a DC bus capacitor 41. The series connection of the active filter 35 to the passive filter 34 may be accomplished using coupling transformers 42 that are chosen to match the inverter current and voltage rating. Alternatively, the inverter 40 may be directly coupled in series with the passive filter 34. A cost optimization between inverter device current and voltage rating and coupling transformers 42 can be done based on manufacturers cost structure for inverter switching devices (IGBTs or GTO thyristors) compared to transformers. It is noted that the inverter switching devices in the hybrid active filter 30 need typically only be rated at a small fraction (e.g., <3%) of the load kVA rating, because the passive filter 34 will block most of the load fundamental voltage. The inverter 40 will typically include output inductances 44. As will be discussed below, the inverter 40 may be controlled to provide an active inductance at selected frequencies to the hybrid filter 30 that, in combination with the inverter inductance 44 and leakage inductance of the transformers 42, eliminates the need for a passive inductor 38 in the passive filter 34.

Figure 5:
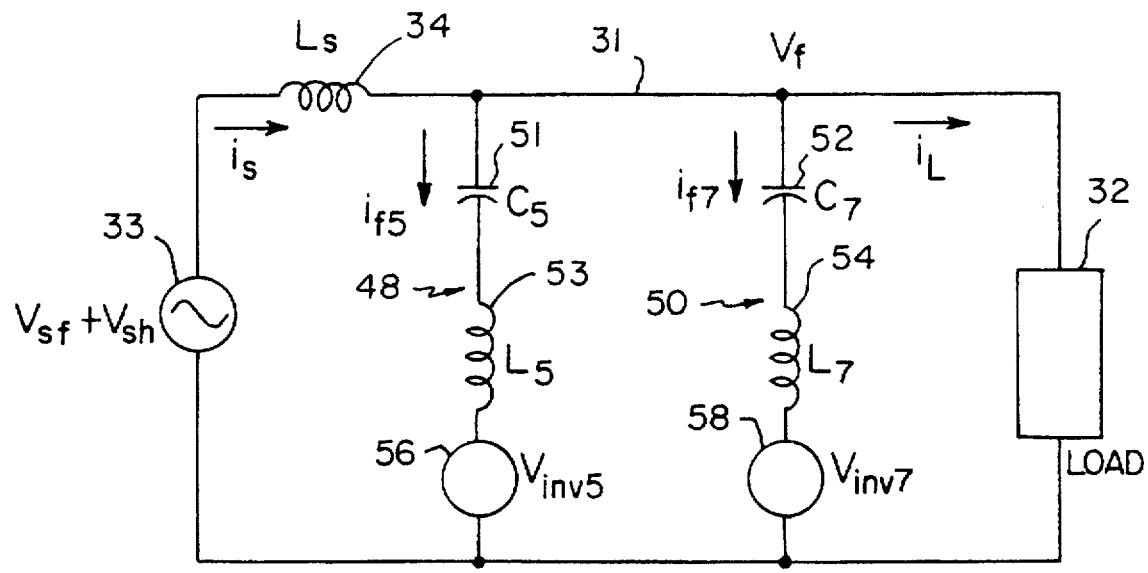
FIG. 5 is a schematic circuit diagram of an equivalent circuit of a parallel hybrid active filter topology in accordance with the present invention for filtering $5^{th}$ and $7^{th}$ harmonics produced by a non-linear load.
Figure 6:
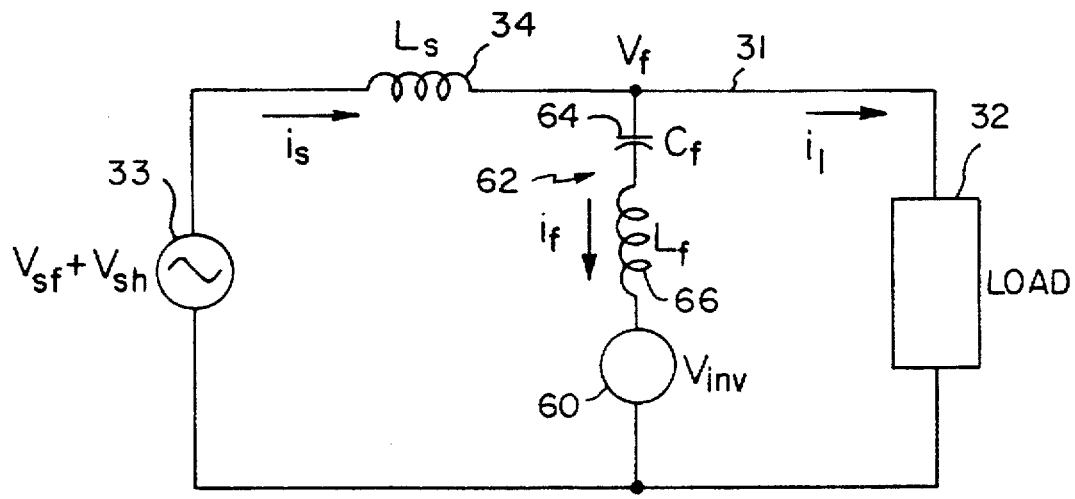
FIG. 6 is a schematic circuit diagram of an equivalent circuit of an alternative parallel hybrid active filter topology in accordance with the present invention for filtering $5^{th}$ and $7^{th}$ harmonics produced by a non-linear load.

Exemplary topologies for parallel hybrid active filter systems in accordance with the present invention are illustrated by the equivalent schematic circuit diagrams of FIGS. 5 and 6. These figures show single phase equivalent circuits for the three phase power systems in which the hybrid active filter 30 of the present invention will typically be employed. Each figure shows the non-linear or combined linear and non-linear load 32, connected to an AC source 33, with source inductance 34. The source voltage may have both fundamental $V_{sf}$ and harmonic $V_{sh}$ components. For large thyristor front-ends with inductive loads 32, the lower order $5$th and $7$th current harmonics predominantly contribute to the total harmonic distortion (THD), and inevitably require harmonic filtering to meet recommended harmonic standards, such as IEEE 519.

The parallel hybrid active filter topology of FIG. 5 includes $5^{th}$ and $7^{th}$ harmonic L-C tuned passive filters 48 and 50. Each passive filter 48 and 50 includes a passive capacitor 51 and 52 and an inductor 53 and 54, respectively. Active filters 56 and 58 are connected in series with each passive filter 48 and 50, and are represented as the voltage source outputs of the active filter inverters. The inverters synthesize orthogonal voltages that are injected into the hybrid filter, thereby implementing dynamically variable inductances at the active filters 56 and 58. Thus, in the topology of FIG. 5, the inductance generated by the active filter 56 operates with the passive filter capacitor 51 and inductor 53 to filter the $5^{th}$ harmonic, and the inductance generated by active filter 58 operates with passive filter capacitor 52 and inductor 54 to filter the $7^{th}$ harmonic.

In the alternative topology of FIG. 6, there is one active filter 60 connected in series with a passive filter 62, including capacitor 64 and inductor 66. The capacitor 64 may be a power factor correction capacitor that performs the entire passive filter function, in combination with the active filter 60, thereby eliminating the need for inductor 66. Multi-tuned filter performance may be achieved in this topology by tuning the passive filter at the $5^{th}$ harmonic by inductor 66, and with the active filter 60 controlled to provide tuning at the $7^{th}$ harmonic frequency along with the passive inductor 66. Thus, the passive filter inductor 66 is tuned to filter the $5^{th}$ harmonic frequency in combination with the passive filter capacitor 64, and the active filter variable inductance 60 is controlled to filter the $7^{th}$ harmonic frequency in combination with the power factor correction capacitor 64 and inductor 66. The separate passive filter inductor 66 may be eliminated, with the filter inductance for the desired harmonic frequency (or frequencies) provided by the inverter output inductance 44 (see FIG. 4) of the active filter inverter 40 (and any transformer leakage inductance) in combination with dynamically variable inductances synthesized by the active filter 60. Different dynamically variable active inductances may be superimposed in the manner described because the active inductances are only generated at the selected harmonic frequencies, and thus do not effect the filter response at other frequencies.

The hybrid active filter system topologies illustrated in FIGS. 5 and 6 are practically viable and cost-effective implementations of the present invention for large non-linear industrial loads. Higher order harmonics (e.g., $>7^{th}$) are typically a smaller portion of the THD, and may be filtered by a high-pass filter or capacitor to meet harmonic standards, such as IEEE 519. The passive filter capacitors 51, 52, and 64 support the fundamental load voltage, and hence enable a small harmonic voltage rating for the active filters 56, 58, and 60. The active filter kVA rating is given by the product of the total rms voltage generated by the active filter and the total passive filter current. It should be noted that many other hybrid active filter system topologies in accordance with the present invention are possible for filtering any desired harmonic frequencies, including higher order harmonics.

Figure 7:
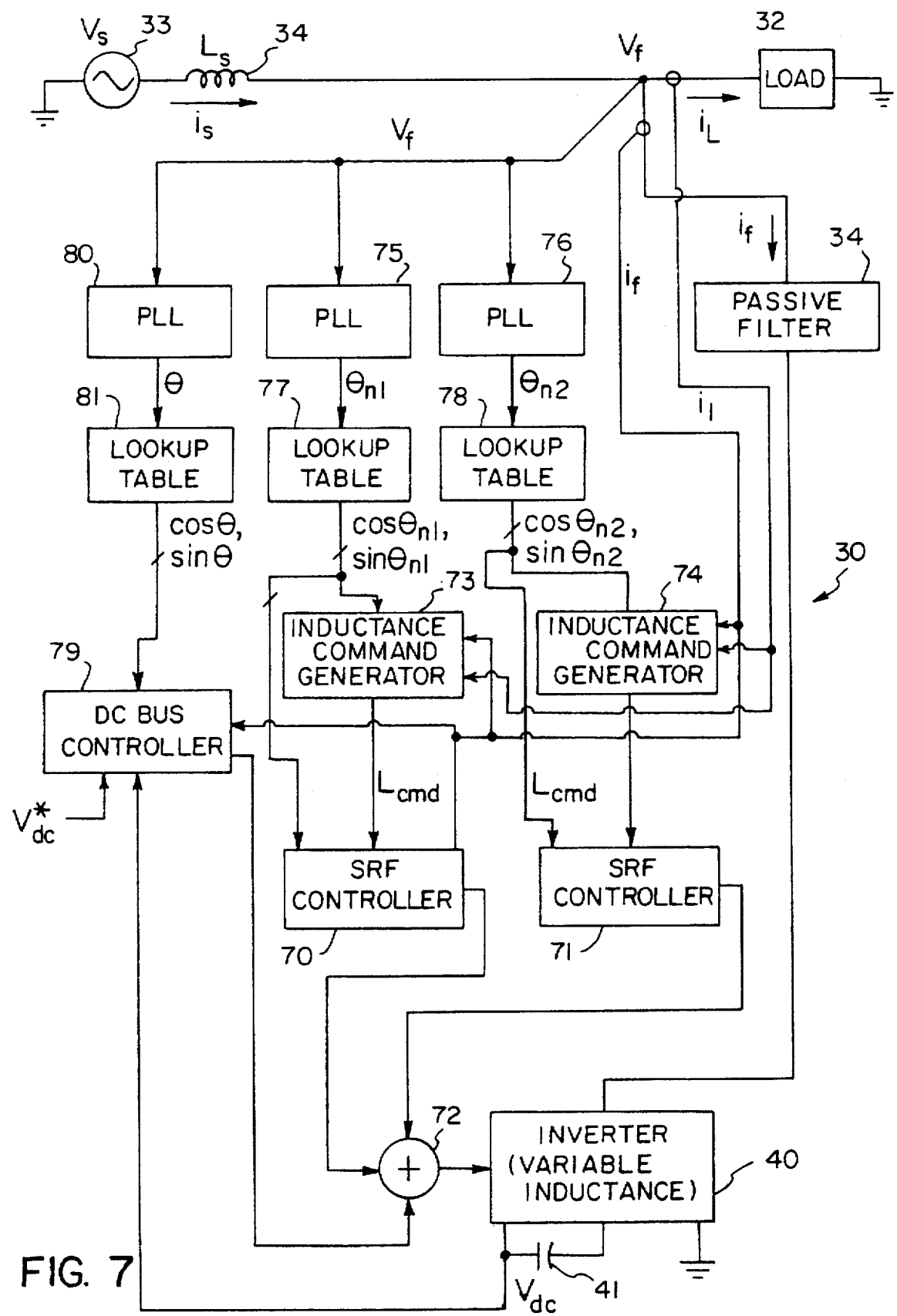
FIG. 7 is a block diagram of a parallel hybrid active filter system in accordance with the present invention showing the main functional components of the active filter control system.

In the parallel hybrid active filter system of the present invention an active filter is used to implement a dynamically variable inductance. Preferably, this dynamically variable inductance is synthesized using an inverter. The inverter must thus be controlled to provide an orthogonal voltage in series with the passive filter of the hybrid active-passive filter system that corresponds to the voltage across a synthesized active inductance. A block diagram of an inverter control system that synthesizes the desired variable inductance is shown in FIG. 7, as part of the hybrid active filter system 30 of the present invention.

Synchronous reference frame (SRF) based controllers 70 and 71 are preferably used to control the inverter 40 to implement dynamically variable negative or positive inductances at selected frequencies by generating active filter inverter voltage command signals. These active filter inverter voltage command signals are applied to the three-phase PWM or square wave voltage source inverter (VSI) 40 that produces the synthesized dynamically variable inductance at the selected frequency. Thus, the active filter inverter voltage command signals provided by the SRF controllers 70 and 71 are used by the conventional converter PWM modulator to generate switching command signals for the inverter 40 that produce the desired active filter voltage that effectively synthesizes the desired dynamically variable inductance. A separate SRF based controller 70 or 71 is used for each harmonic frequency to be filtered. The active filter inverter voltage command signals are combined at a summing junction 72 before being applied to the inverter 40. This superposition of voltage command signals is possible because each controller 70 and 71 synthesizes a dynamically variable inductance at a separate harmonic frequency. It is clear that a single actively variable inductance, using a single SRF based controller, or more than two actively variable inductances, using more than two SRF based controllers, may be generated in accordance with the present invention, by combining any additional inverter voltage commands at the junction 72.

The SRF controllers 70 and 71 generate the active filter inverter voltage command signals in response to active inductance command signals $L_{cmdn}$ for each selected harmonic frequency to be filtered. The active inductance command signals $L_{cmd}$ are produced by inductance command signal generators 73 and 74. Note that the inductance command signal generators 73 and 74 are preferably implemented as a part of the SRF controllers 70 and 71, and may share selected components therewith, as described in more detail below.

The SRF controllers 70 and 71 generate the active filter inverter voltage command signals based upon a measured value of the filter current $i_f$ and the active inductance command signal $L_{cmd}$. The filter current $i_f$ may be obtained in a conventional manner, using a current transformer or some similar device.

Figure 1:
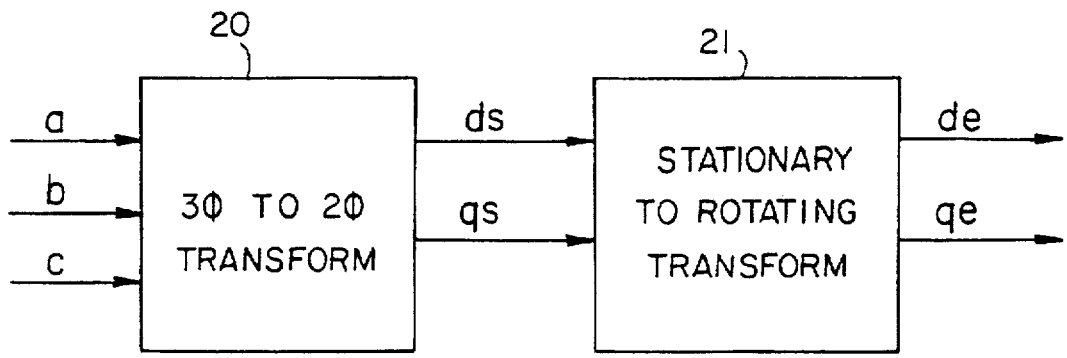
FIG. 1 illustrates a three-phase to synchronously rotating two-phase reference frame transformation, used in a synchronous reference frame based controller, and its corresponding mathematical model.
Figure 2:
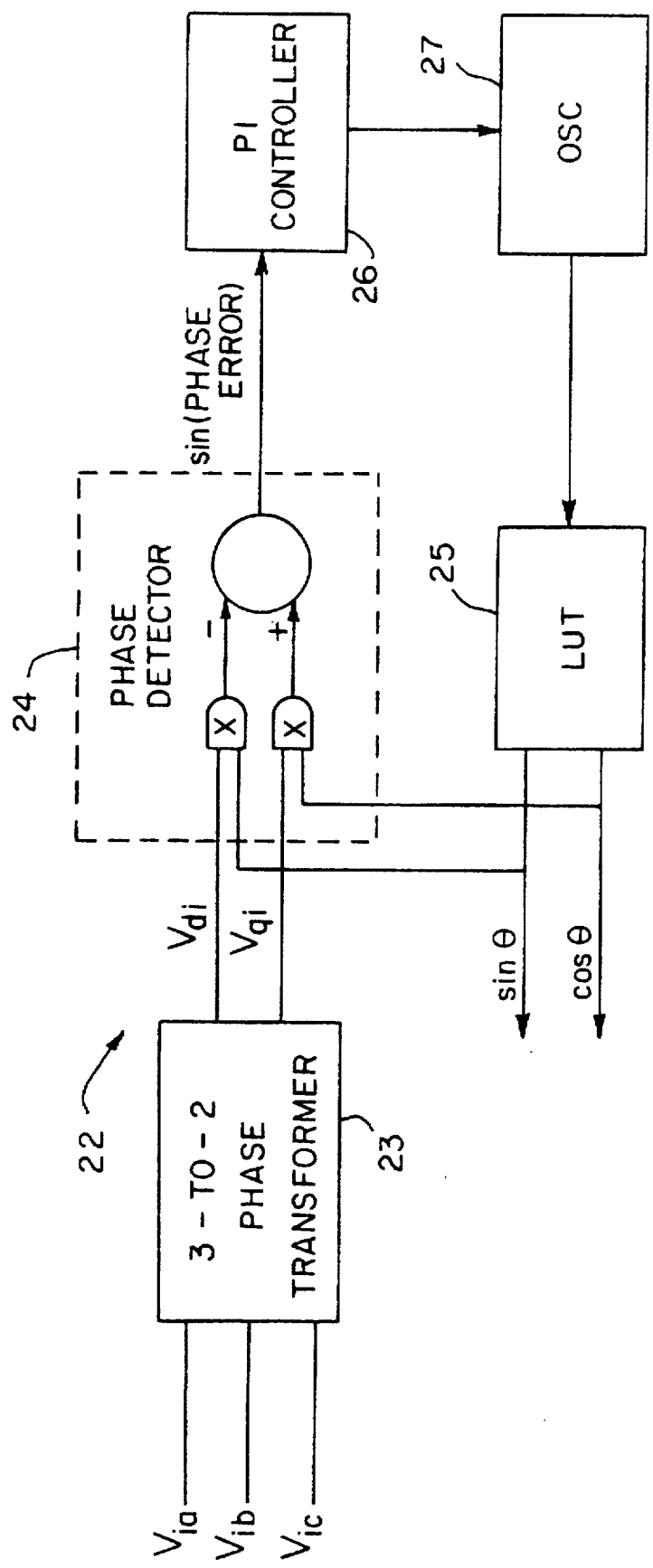
FIG. 2 is a block diagram of a phase-locked loop which may be used in conjunction with a synchronous reference frame based controller.
Figure 3:
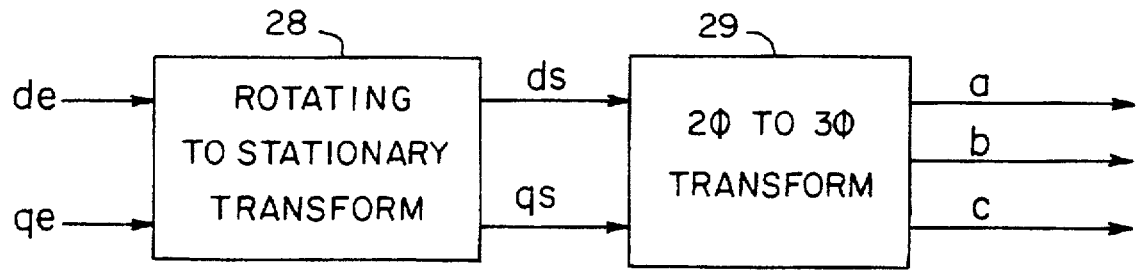
FIG. 3 illustrates a synchronously rotating two-phase to three-phase reference frame transformation, as used in a synchronous reference frame based controller, and its corresponding mathematical model.

The SRF based controllers 70 and 71 also require the values of $\cos\theta_n$ and $\sin\theta_n$ unit vectors calculated at the harmonic frequency of interest. These unit vectors are provided by phase lock loops (PLL) 75 and 76 for each selected frequency. Note that, although separate PLLs 75 and 76 are shown, PLLs for different selected harmonic frequencies may share many of the same components. The PLLs 75 and 76 are phase locked to the terminal voltage $V_f$ across the hybrid filter 30, to generate the signal $\theta_n$ at the selected frequency. The $\theta_n$ signal may be fed to lookup tables 77 and 78 to generate the $\cos\theta_n$ and $\sin\theta_n$ unit vectors. The PLLs 75 and 76, including lookup tables 77 and 78, may be implemented using a PLL such as that shown in FIG. 2, or other conventional analog or digital PLLs, including PLLs implemented using microprocessors or digital signal processors (DSP).

The inductance command signal generators 73 and 74, also operating under the SRF principle, generate the active inductance command signals $L_{cmd}$ based upon the measured filter current $i_f$ and the measured load current $i_L$. The load current $i_L$ may be obtained in a conventional manner, using a current transformer or other similar device. The $\cos\theta_n$ and $\sin\theta_n$ unit vectors, at the selected harmonic frequency of interest, produced by the PLLs 75 and 76 and lookup tables 77 and 78, are also employed by the inductance command generators 73 and 74.

DC bus control inverter voltage command signals, generated by a DC bus controller 79, are preferably added to the active filter inverter voltage commands produced by the SRF controllers 70 and 71. The DC bus control inverter voltage command signals generated by the DC bus controller 79 may be summed with the active filter inverter voltage command signals generated by the SRF controllers 70 and 71 at the summing junction 72, before being provided to the inverter 40. The DC bus controller 79 is required to provide for inverter losses and maintain the DC bus capacitor voltage. The DC bus controller preferably also operates using SRF based principles, generating the DC bus inverter voltage command signals from the filter current $i_f$ at the fundamental frequency, and employing $\cos\theta$ and $\sin\theta$ unit vectors provided by a PLL 80 and lookup table 81, operating at the fundamental frequency $\theta$. The DC bus controller 79 also uses the measured the voltage $V_{dc}$ across the DC bus 41 and a DC bus reference voltage $V_{dc}^*$ as inputs. The DC bus inverter voltage command signals generated by the DC bus controller 79 result in switching of the inverter to generate a small fundamental voltage in phase with the fundamental passive filter reactive current. This ensures that real power flow occurs only at the fundamental frequency, and not at harmonic frequencies, to avoid supply-passive filter interaction and supply current distortion. The DC bus controller 79 thus controls the inverter 40 to maintain a DC voltage on the DC bus 41, at the DC bus reference voltage level $V_{dc}^*$, while preventing interaction between the PWM VSI 40 and the passive filter components 34.

The synchronous reference frame (SRF) based controller 70 is described in more detail with reference to the schematic circuit diagram of FIG. 8. This circuit implements a dynamically variable, either negative or positive, inductance $Lcmd_n$, where n designates the harmonic to be filtered. The SRF controller 70 generates 'active inductor' voltage command signals for a specified harmonic n, which are then used to synthesize the desired active inductor voltage by a three phase PWM or square-wave VSI 40. The three phase active filter currents $i_a$, $i_b$, and $i_c$ are measured (using a current transformer or similar device), and are transformed into a synchronously rotating two phase d-q reference frame, at the specified harmonic frequency of synthesis of $Lcmd_n$, by a three phase to two phase SRF transformer 82. Thus, $i_a$, $i_b$ and $i_c$ are transformed to $i^e_q$ and $i^e_d$, where $i^e_q$ and $i_{ed}$ are 90° out of phase with each other in the manner described previously.

Figure 9A:
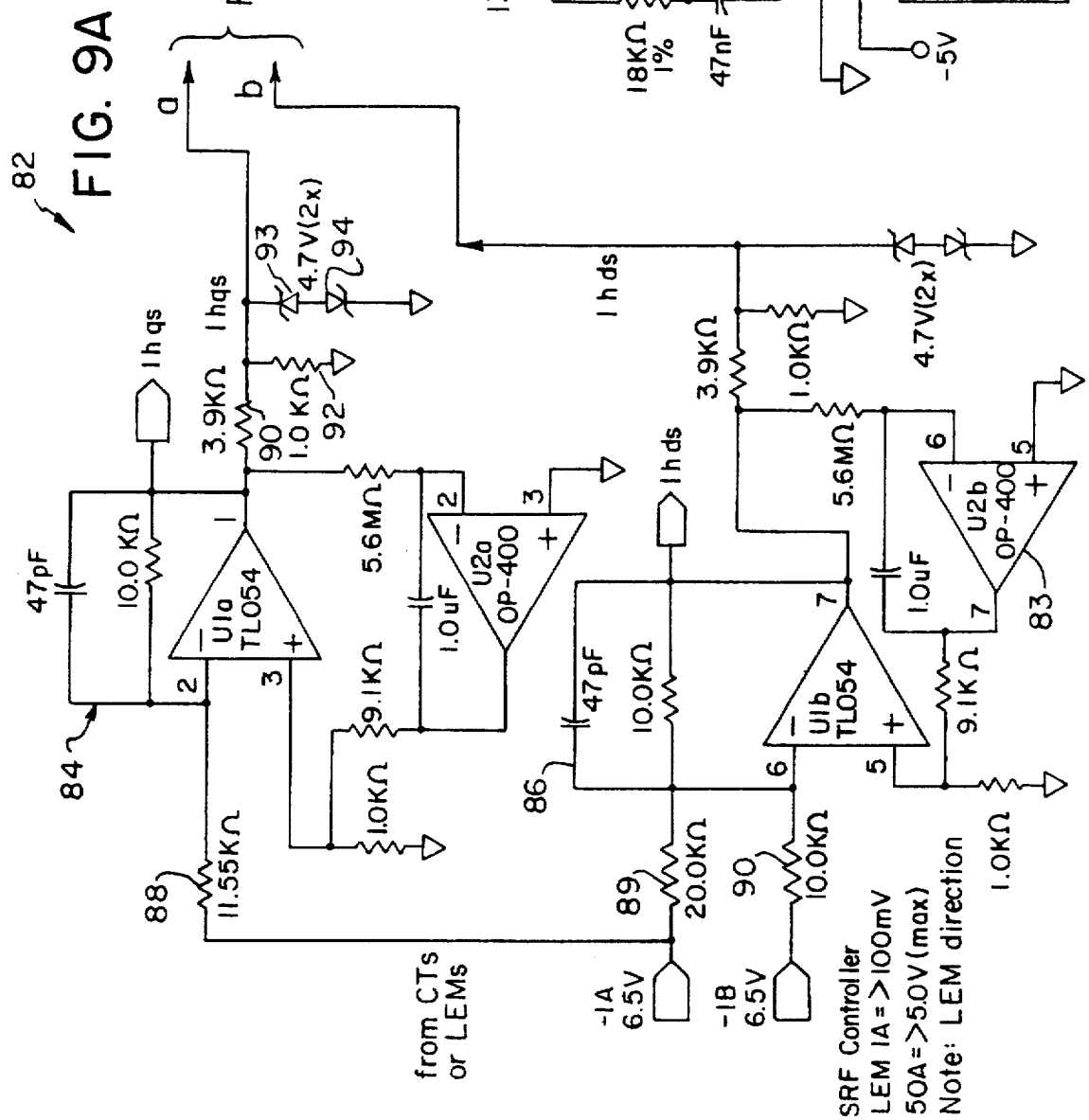
FIG. 9 is a schematic circuit diagram of a three-phase to two-phase synchronous reference frame transformer employed in the controller for the hybrid active filter of the present invention.
Figure 9B:
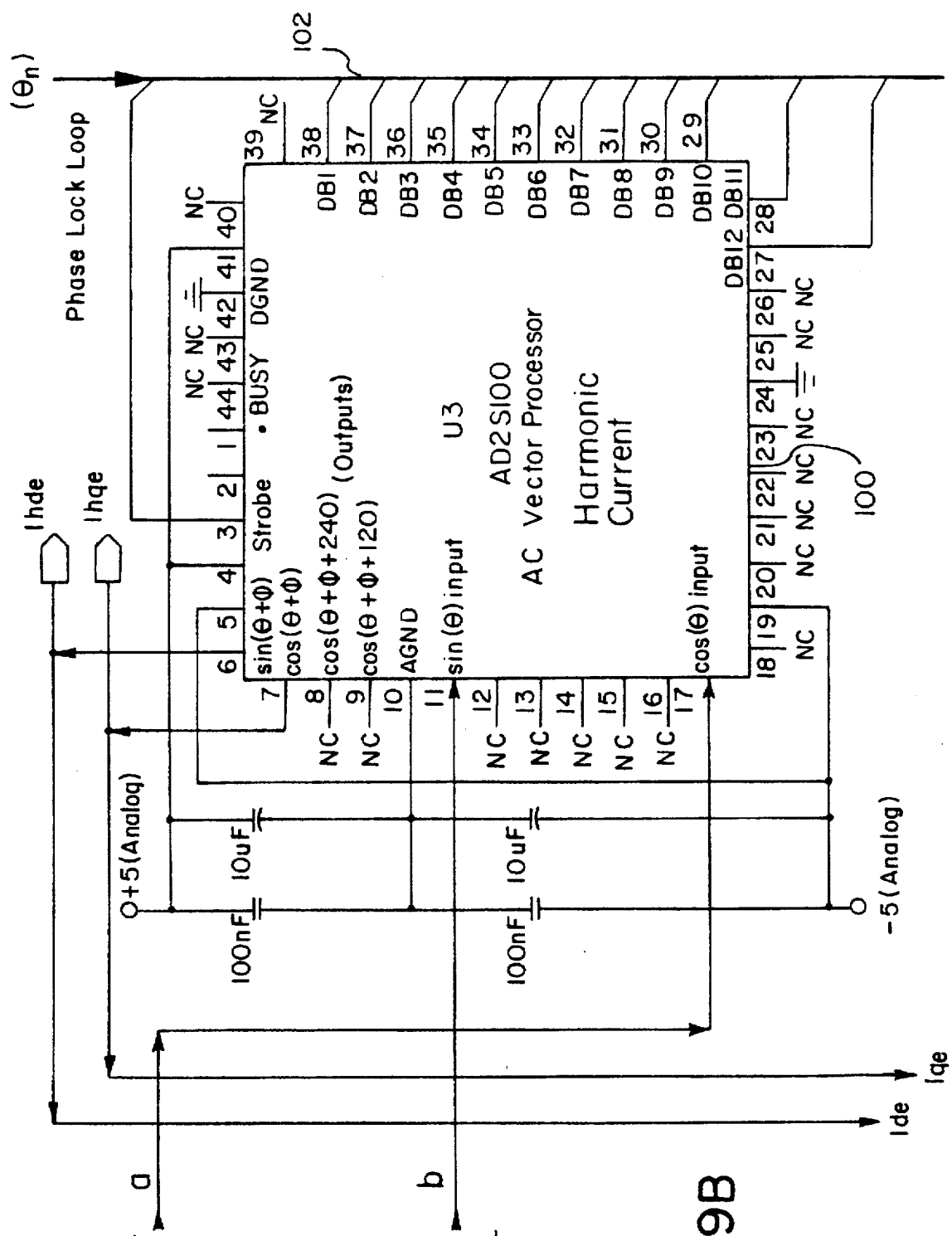

An exemplary circuit for implementing the three phase to two phase synchronous reference frame transformer 82 is illustrated in FIG. 9. An amplifier circuit 83 is used to perform the initial transformation of the three phase signal to the two phase stationary ds-qs reference frame. This circuit takes advantage of the relationship between the three phase reference currents $i_a$, $i_b$ and $i_c$. Since $i_c=-i_a-i_b$, only two measured phase currents $i_a$ and $i_b$ are needed to perform the phase transformation. Thus, a first amplifier circuit 84 generates $i^s_q$ from $i_a$. In a similar manner, a second amplifier circuit 86 generates current $i^s_d$ in the stationary two phase reference frame based on three phase current values $i_a$ and $i_c$. The amplifier circuits 84 and 86 generate $i^s{}_d$ and $i^s{}_q$ in the stationary two phase reference frame by combining $i_a$ and $i_b$, multiplied by the appropriate constants as defined by Equation 1. Note that the two amplifier circuits 84 and 86 are identical, however, resistor 88 in amplifier circuit 84, and resistors 89 and 90 in amplifier circuit 86, have resistance values chosen to provide multipliers of the desired ratio between $i_a$ and $i_b$ to form $i^s{}_a$ and $i^s{}_d$. Resistors 90 and 92, and back to back zener diodes 93 and 94, in each amplifier circuit 84 and 86 provide a voltage divider for reducing the scale of the $i^s{}_q$ and $i^s{}_d$ quantities and a voltage limiter, respectively.

Multiplication by the $\sin\theta_n$ and $\cos\theta_n$ unit vectors is achieved in the SRF transformer circuit 82 shown in FIG. 9 by use of an integrated circuit AC vector processor chip 100, such as the AD2S100 or AD2S105. The stationary two phase reference frame quantities $i^s{}_q$ and $i^s{}_d$ are input to the vector processor 100 at the $\sin\theta$ and $\cos\theta$ inputs, respectively. The rotating two phase reference frame quantities $i^e{}_q$ and $i^e{}_d$ are output from the vector processor 100. The amount by which the stationary two phase reference frame quantities $i^s{}_q$ and $i^s{}_d$ are rotated to form the rotating two phase reference frame quantities $i^e{}_q$ and $i^e{}_d$ is determined by a digital signal, representative of the phase angle θ, which is applied on lines 102 to the database inputs of the vector processor 100. The lines 102 act as address lines to address values in a look up table within the vector processor 100 that correspond to the $\cos\theta_n$ and $\sin\theta_n$ values at the harmonic n that are required by Equation 2. Thus, the lookup table function 77 of FIG. 7 is implemented in the vector processor 100. Other circuits may also be used to accomplish the three phase to stationary two phase reference frame transformation, and to achieve the transformation from stationary to synchronous rotating two phase quantities. For example, a digital implementation of the three-phase to two-phase transformer 82, using a microprocessor or digital signal processor (DSP), may be used.

Figure 10A:
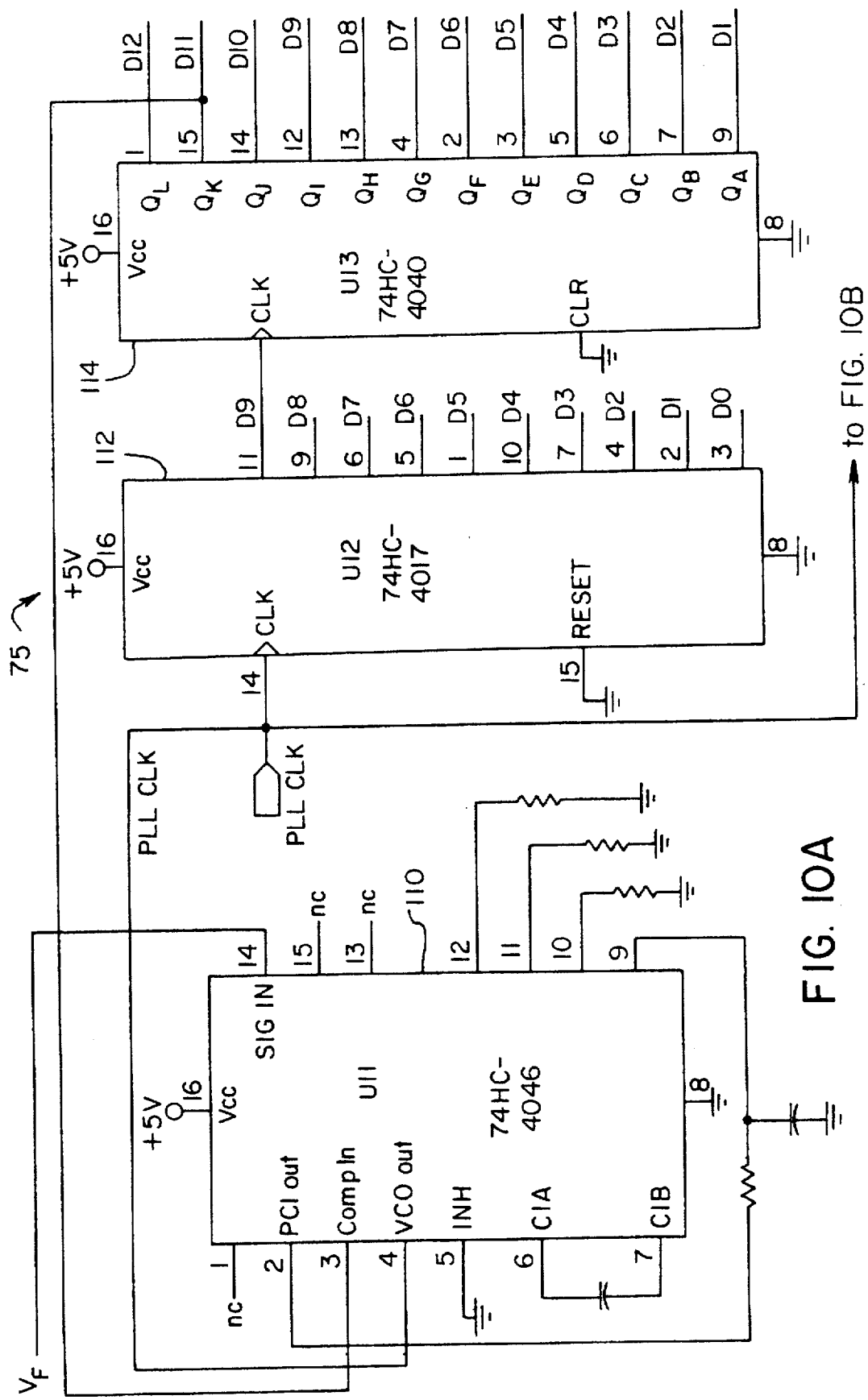
FIG. 10 is a schematic circuit diagram of a phase lock loop employed in the controller for the hybrid active filter of the present invention
Figure 10B:
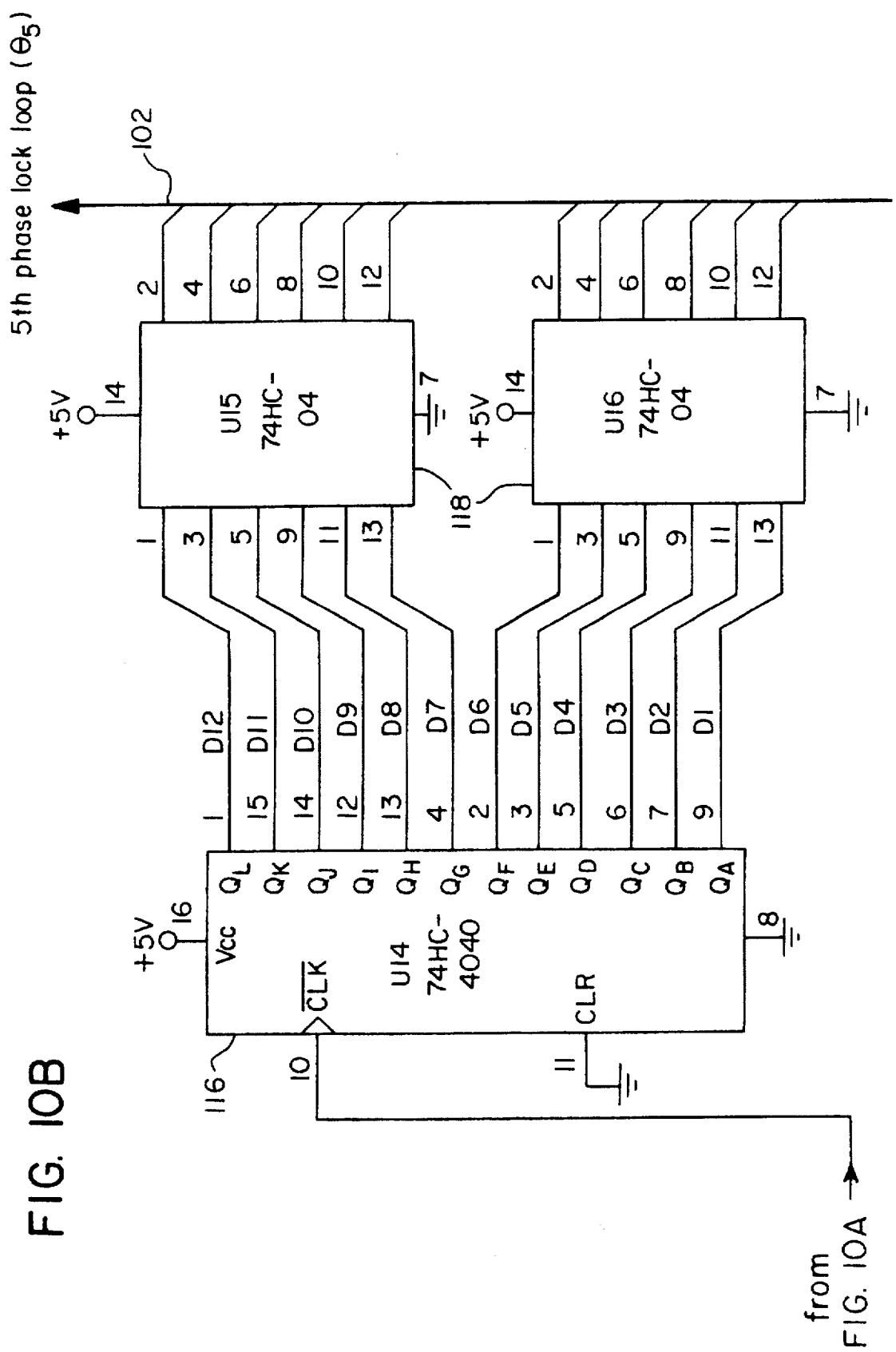

The stationary to rotating two phase transformation is preferably based on $\cos\theta_n$ and $\sin\theta_n$ values that are derived from a phase lock loop (PLL) 75 on the filter terminal voltage $V_f$. For the three phase to two phase SRF transformer circuit 82 shown in FIG. 9, a corresponding PLL 75 is illustrated in FIG. 10. The line to neutral filter terminal voltage $V_f$, for any one phase, is applied to the input of integrated circuit 110. A clocking signal output of the circuit 110 increments the counts in series connected decade counter 112 and binary counter 114, and binary counter 116. The outputs of binary counter 116 are address signals correspond to $\theta_n$, where, in this case, n=5 (the fifth harmonic). These signals are inverted by inverters 118 and applied to the line 102 where they may be used by vector processor circuits, such as vector processor 100 in FIG. 9, as addresses for internal lookup tables containing the desired $\sin\theta_n$ and $\cos\theta_n$ values. The inverters 118 are used, in this case, because the fifth harmonic has a negative or reversed direction of rotation with respect to the fundamental frequency. The output of the binary counter 114 is a signal pulse at the fundamental frequency of $V_f$, e.g., 60 Hz. This signal is fed back as an input to the integrated circuit 110. The integrated circuit 110 adjusts its clocking rate output to bring the signal received from the counter 114 into phase lock with the $V_f$ input signal. Other PLL circuits, including PLLs implemented digitally in microprocessors or digital signal processors (DSPs) may also be used.

By transforming the three phase currents $i_a$, $i_b$, and $i_c$ to two phase rotating reference frame quantities $i_d{}^e$ and $i_q{}^e$, using $\sin\theta_n$ and $\cos\theta_n$, the $n^{th}$ harmonic current is transformed to a DC quantity. This DC quantity is extracted by low-pass filters (LPF) 130 and 132 to yield $i^e{}_{qf}$ and $i^e{}_{df}$.

Extraction of the DC signal by LPFs 130 and 132 provides insensitivity to phase errors. This is an advantage, since most other controllers will introduce significant phase shift at fundamental and harmonic frequencies. A suitable second order Butterworth low-pass filter transfer function is as follows:

$$G(s) = \frac{1}{[s^2/w_c^2 + S/QW_c + 1]} \quad (6)$$

where Q is the Q-factor of the low-pass filter. A Butterworth filter is preferable because it provides a maximally flat low pass response. Since the fundamental component in the synchronous reference frame is a DC signal, recovery of this signal requires a maximally flat low-pass filter response.

Figure 11:
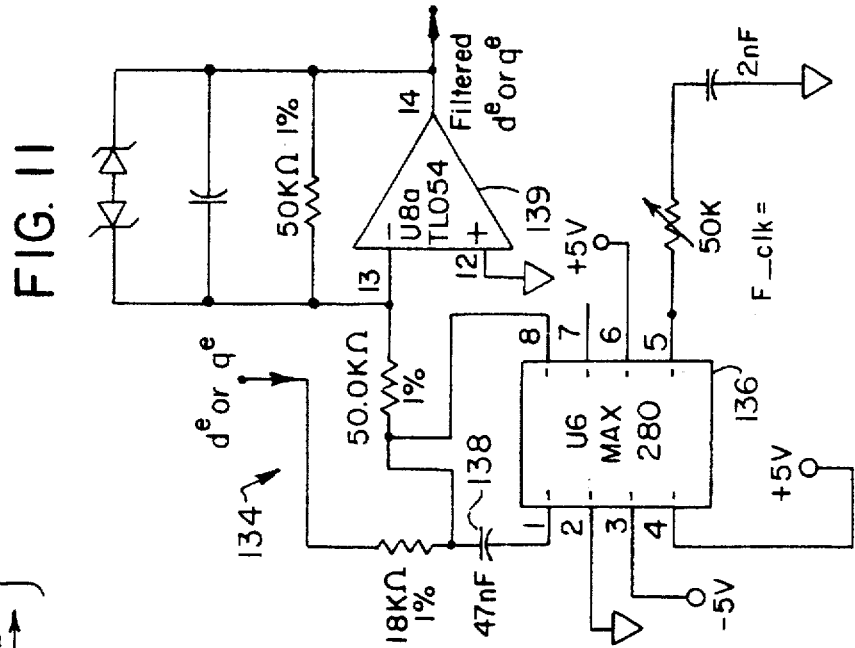
FIG. 11 is a schematic circuit diagram of a switched capacitor low pass filter employed in the controller for the hybrid active filter of the present invention.

The low pass filters 130 and 132 may be implemented using switched capacitor low pass filters 134, of the type illustrated in FIG. 11. In the switched capacitor low pass filter 134, an integrated circuit switch 136 switches to extract the DC component from an input signal. An amplifier circuit 139 provides an output buffer for the LPF 134. Of course, other low pass filter designs may also be employed, such as LPFs using an analog Sallen-key approach, or digital LPFs implemented in a digital signal processor (DSP).

The 'active inductor' voltage command signal $V_{Lcmd_n}$, that will be provided to drive the inverter 40, is given by:

$$V_{Lcmd_n} = L_{cmd_n} \frac{di_{Lcmd_n}}{dt} \quad (7)$$

where $L_{cmd_n}$ is the 'active inductance' command signal for compensation of the $n^{th}$ harmonic frequency as calculated by the inductance command signal $L_{cmd_n}$ generator portion 73 of the SRF controller 70, and $i_{Lcmd_n}$ is the filter current, defined in the two phase rotating synchronous reference frame by $i_{qfn}{}^e$ and $i_{dfn}{}^e$. The effective differentiation of current in steady state is preferably achieved by interchanging the $i^e{}_q$ and $i^e{}_d$ current quantities and multiplying by the selected harmonic frequency $\omega_n$. This operation is valid because of the orthogonal relationship between the current and voltage for an inductor. The frequency $\omega_n$ may be obtained from the PLL 75, and is multiplied at junctions 140 and 142 to the rotating two-phase reference frame quantities $i^e{}_{qfn}$ and $i^e{}_{dfn}$, along with the active inductance command signal $L_{cmd_n}$. The interchange of $i^e{}_{qfn}$ and $i^e{}_{dfn}$ is illustrated at 144 in FIG. 8. (The interchange must take place prior to retransforming the two phase quantities $i^e{}_{qfn}$ and $i^e{}_{dfn}$ to three phase quantities.) The interchanged d-q quantities are multiplied by a constant k or –k equal to 1 or –1 at 146 and 148, which, in combination with the interchange 144 of the d-q quantities, effects a 90° phase rotation of the quantities.

The resulting synchronously rotating two phase reference frame inductance voltage command signals $V^e{}_d$ and $V^e{}_q$ are then transformed to the three phase reference frame active filter voltage command signals $v^*_{inva}$, $v^*_{invb}$ and $v^*_{invc}$ in the manner described earlier, using a two phase to three phase reference frame transformer 150.

Figure 12A:
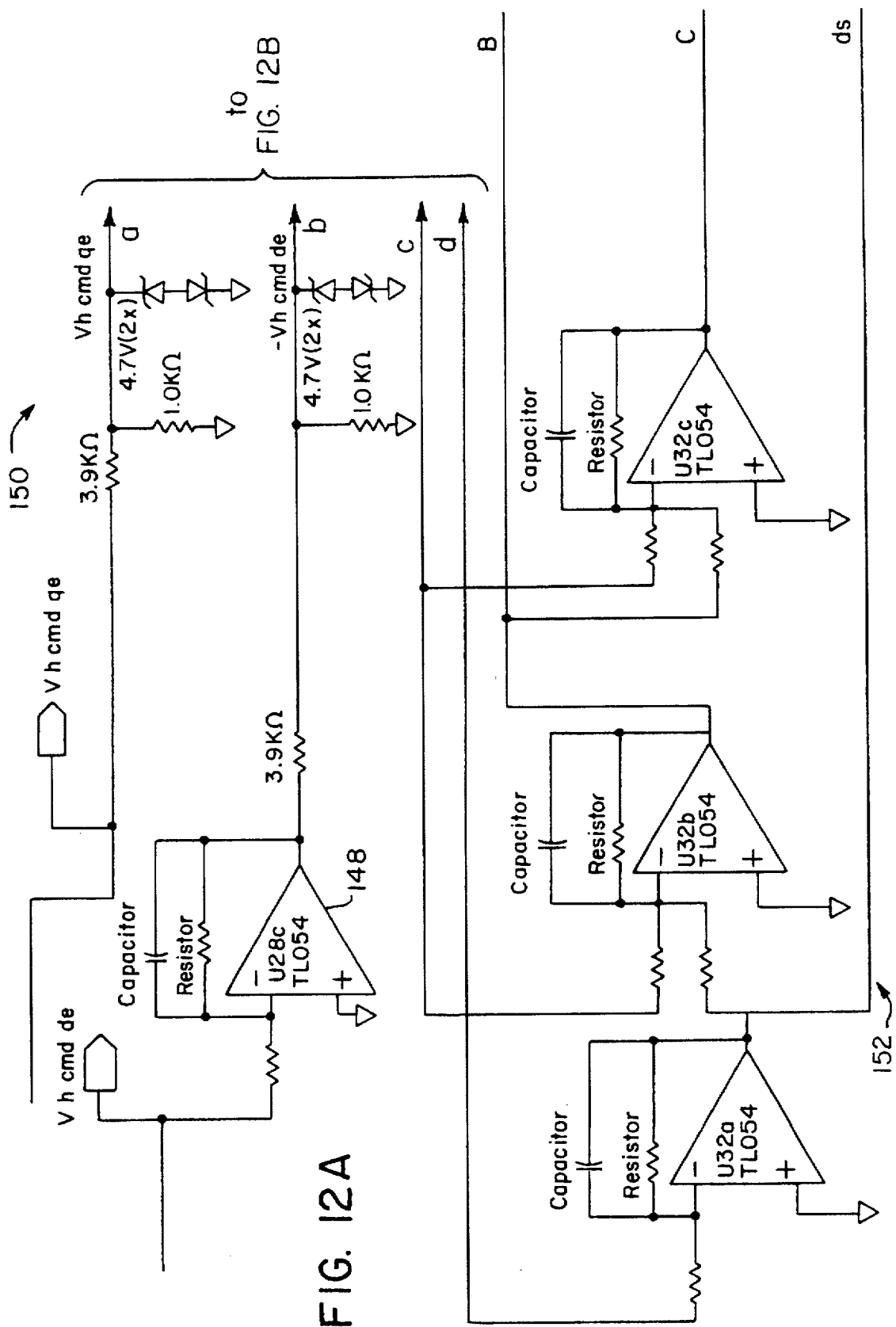
FIG. 12 is a schematic circuit diagram of a two-phase to three-phase synchronous reference frame transformer employed in the controller for the hybrid active filter of the present invention.
Figure 12B:
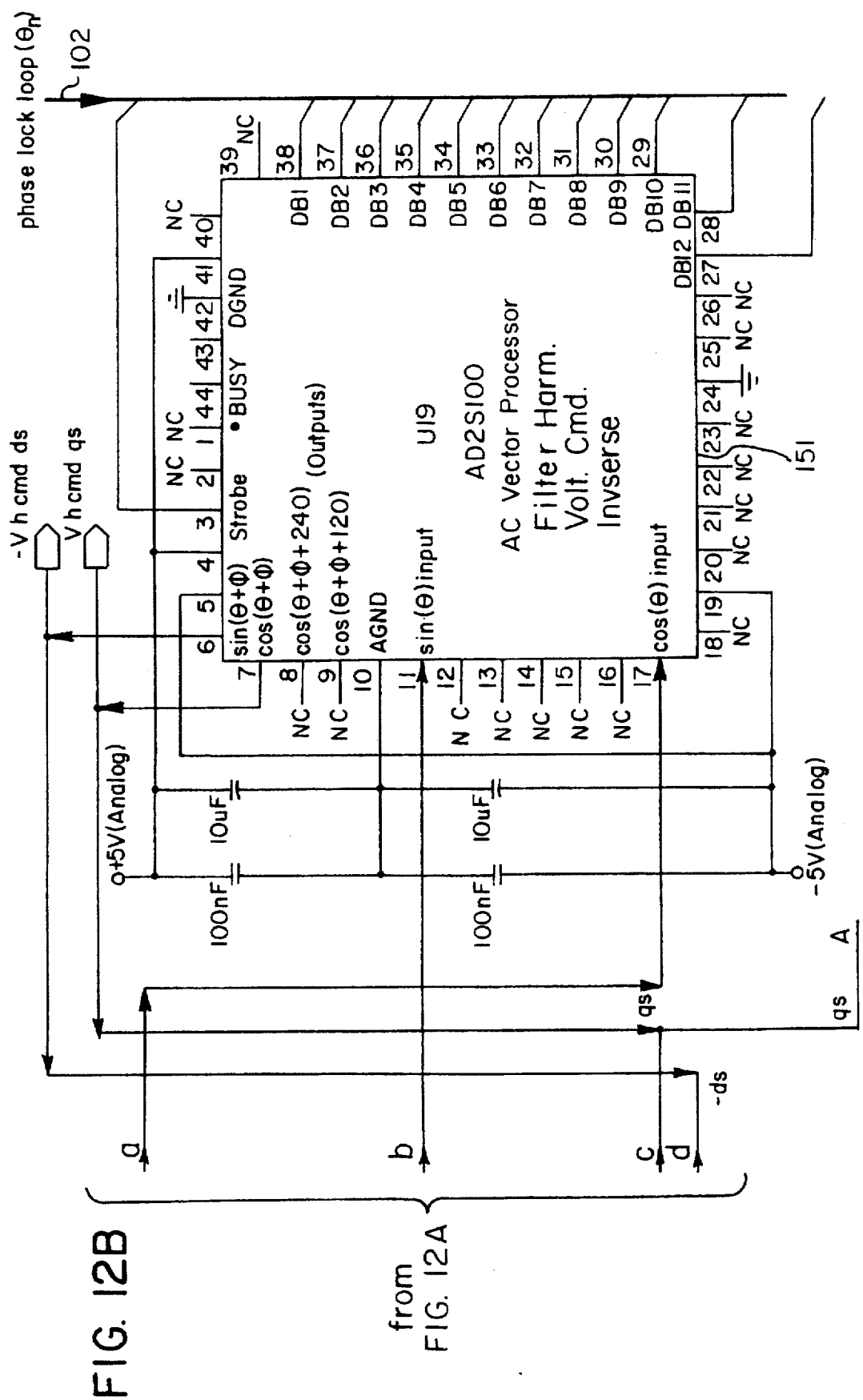

A schematic circuit diagram of an exemplary two phase to three phase transformer 150 is illustrated in FIG. 12. An inverting amplifier 148 implements the multiplication by k=–1, for, in this case, the $V^e{}_d$ value. This is appropriate for negative sequences, such as for the 5$^{th}$ harmonic. An integrated circuit vector processor chip 151 performs the two phase rotating to two phase stationary transformation. The required multiplications by $\sin\theta_n$ and $\cos\theta_n$, as required by Equation 4, are implemented in the circuit 151 by an internal lookup table addressed by the address signals on the lines 102 from the PLL 75 corresponding to $\theta_n$. The outputs of the vector processor 151, representing voltage values in the stationary two phase reference frame, are applied to an amplifier circuit 152 that multiplies the stationary two phase reference frame values by the constants required by Equation 5, to transform the two phase values into the three phase reference frame. Other analog or digital circuits, including digital signal processor circuits, may be used to implement the two phase to three phase transformer 150.

Figure 8:
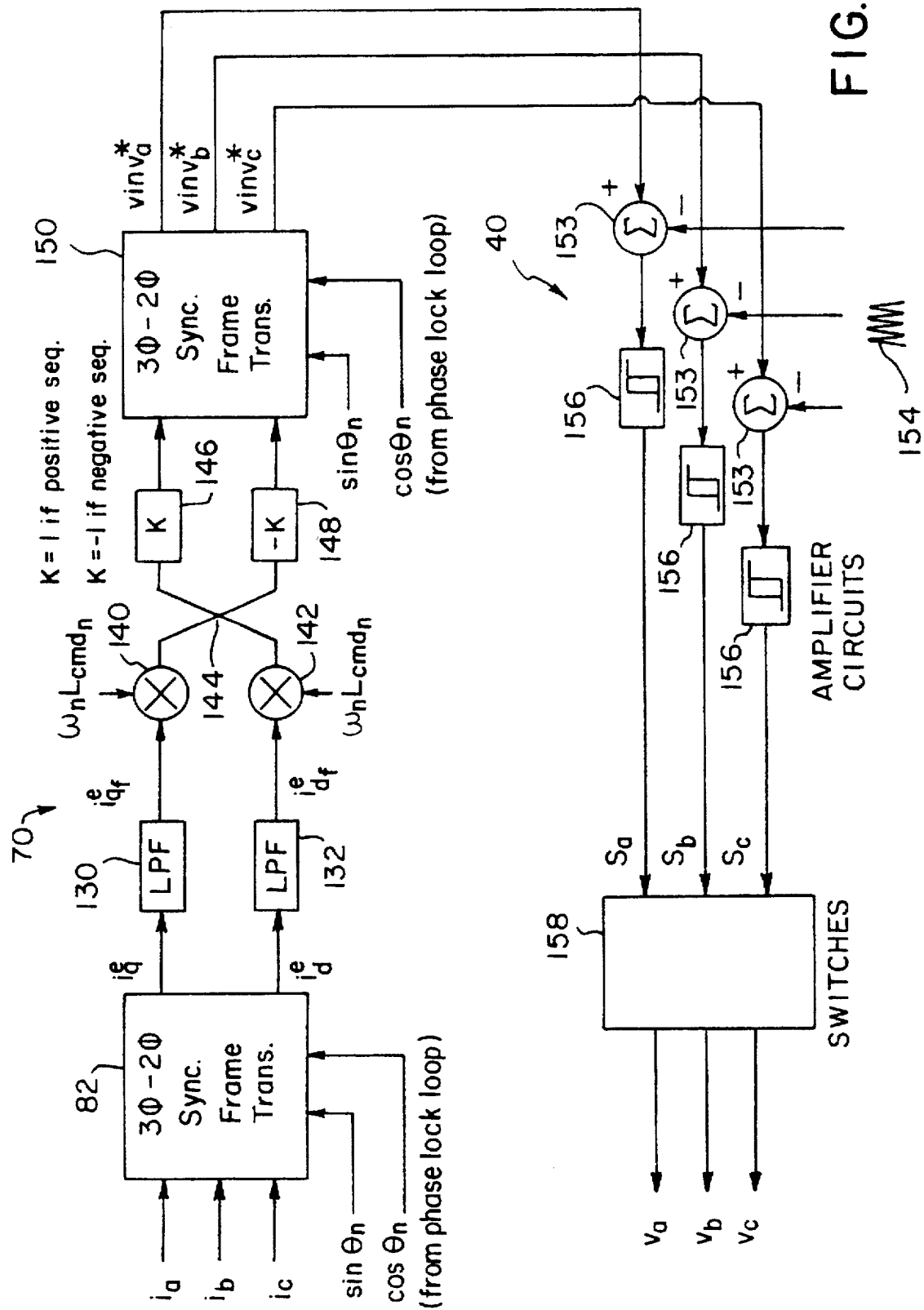
FIG. 8 is a block diagram of a synchronous reference frame based controller for the hybrid active filter of the present invention.

The command voltage signals $V^*_{inva}$, $V^*_{invb}$ and $V^*_{invc}$ may be synthesized by a sine-triangle carrier based PWM VSI 40 as shown in FIG. 8, or by another type of PWM converter or by a square-wave VSI with a triangle carrier at the same $n^{th}$ harmonic frequency. For example, for a 60 Hz fundamental, a carrier frequency of 300 Hz is required for n=5($5^{th}$ harmonic). The triangle carrier based PWM VSI 40 operates in a conventional manner. The three phase active filter inverter voltage command signals $V^*_{inva}$, $V^*_{invb}$ and $V^*_{invc}$ are applied to summing junctions 153 where they are combined with the sine-triangle carrier signal 154. The resulting signals are then applied to amplifier circuits 156 to generate switching signals $S_a$, $S_b$, and $S_c$ for each phase of the inverter output voltage. The switching signals $S_a$-$S_c$ thus operate switches 158, such as transistors (IGBTs etc.), in the inverter 40, to synthesize the desired three phase output voltage waveforms $V_a$, $V_b$, and $V_c$ to implement the required dynamically variable inductance at the selected harmonic frequency to compensate for the desired harmonic frequency.

The SRF controller for implementing a variable inductance in accordance with the present invention facilitates synthesis of different $L_{cmd_n}$ inductance values at multiple harmonic frequencies n by superposition of desired active inductor voltages. For example, different inductance values $L_{cmd_5}$ and $L_{cmd_7}$ for the $5^{th}$ and $7^{th}$ harmonics, respectively, can be synthesized simultaneously. This is achieved by generating active filter inverter voltage command signals for each harmonic frequency. A separate SRF controller 70 and inductance command generator 73 are used for each frequency. The three phase active filter inverter voltage command signals are then superimposed, by adding them together before applying them to the inverter modulator. Conventional variable reactance schemes can only synthesize one active inductance value at a single frequency. The direct generation of active filter inverter voltage command signals allows the use of voltage based PWM schemes that can be implemented by simple and constant switching frequency sine-triangle or space vector based PWM modulators. Hysteresis current regulation schemes are required in conventional variable reactance schemes. These have several undesirable features, such as low frequency current errors, and limit cycles in current and do not maintain a constant switching frequency. Voltage based PWM schemes require lower inverter bandwidth than conventional current regulated PWM schemes, and hence are the preferred solution for high power applications.

Figure 13:
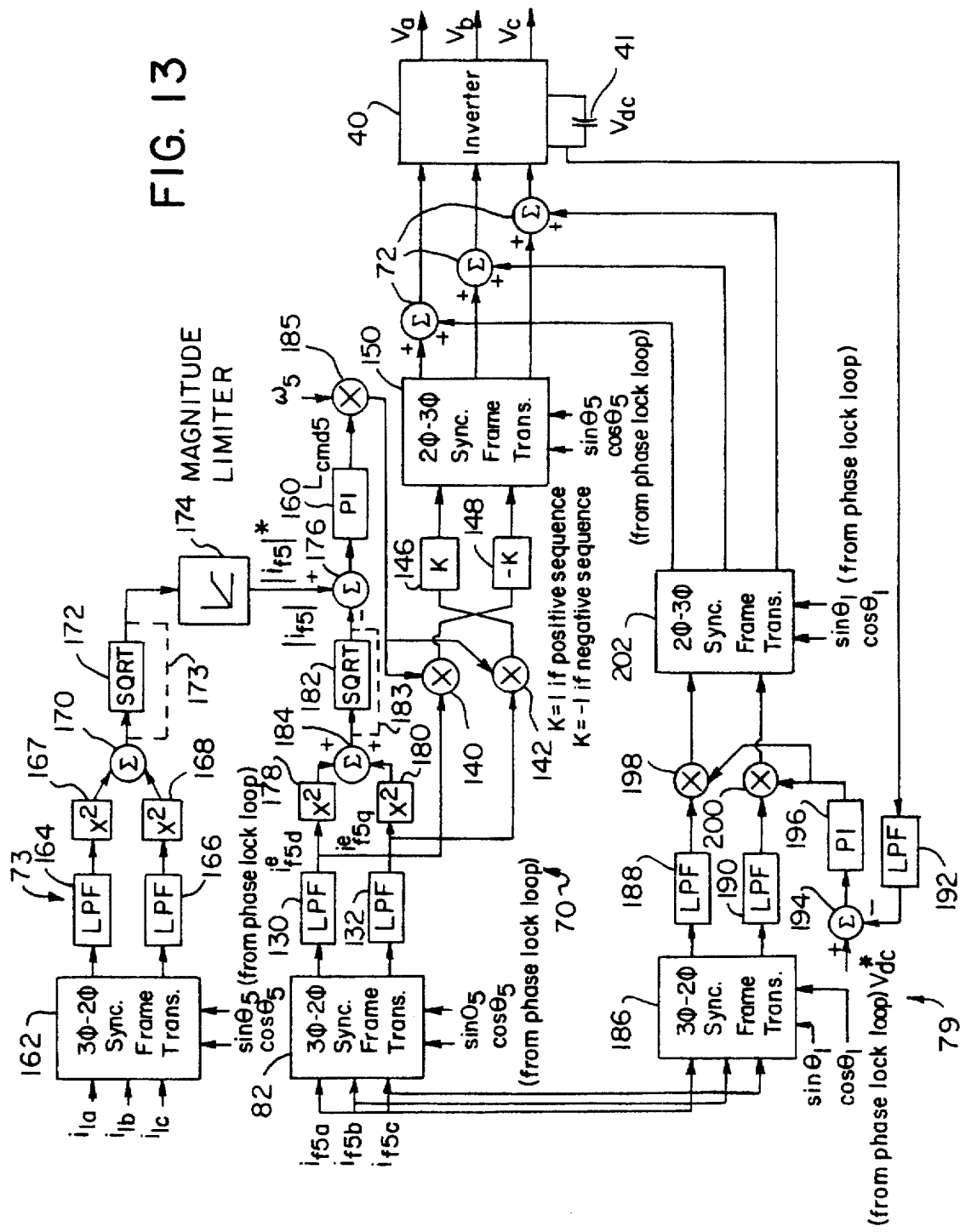
FIG. 13 is a block diagram of a synchronous reference frame based controller for a parallel hybrid active filter system in accordance with the present invention for filtering the $5^{th}$ harmonic current produced by a non-linear load.

A complete SRF based controller implementation for the $5^{th}$ harmonic filter branch of a parallel hybrid active filter system as shown in FIG. 5 is described with reference to FIG. 13. The SRF controller 70 and inductance command signal generator 73 for the $5^{th}$ harmonic are shown, along with the DC bus controller 79. The SRF controller 70 operates as described with respect to, in this case, the harmonic frequency for n=5. An identical controller system may be implemented for the $7^{th}$ harmonic filter branch of the hybrid filter system of FIG. 5.

The SRF controller 70 employs the measured filter currents $i_{fa}$, $i_{fb}$, and $i_{fc}$ to generate active filter inverter voltage command signals in response to an active inductance command signal $L_{cmd_5}$ in the manner described above with respect to FIG. 8. The active inductance command signal $L_{cmd_5}$ is generated by a proportional integral PI controller 160 to achieve the intended function of harmonic compensation. The PI controller 160 is a conventional PI controller normalized to generate the active inductance signal $L_{cmd}$ value at one given selected frequency, from a value representing a difference in the load and filter harmonic current magnitudes at the selected harmonic frequency at its inputs.

To form the inductance command signal $L_{cmd_5}$ (at the $5^{th}$ harmonic), the load currents $i_{la}$, $i_{lb}$ and $i_{lc}$ are measured and transformed into a rotating two phase synchronous reference frame at the $5^{th}$ harmonic frequency. Note that at the $5^{th}$ harmonic the two phase synchronous reference frame will be rotating in a negative direction; i.e., it is a negative sequence. The phase transformation is accomplished using a three phase to two phase SRF transformer 162. For example, a three phase to two phase transformer of the type illustrated in FIG. 9 may be used. Note that $\sin\theta_n$ and $\cos\theta_n$, derived from a PLL 75 and lookup table 77, are used for the three phase to two phase transformation, with, in this case n=5. The three phase to two phase transformer 162 produces the rotating two phase load current quantities $i^e_{lq}$ and $i^e_{ld}$. The DC component of these quantities represent the load current at the $5^{th}$ harmonic. The DC components of $i^e_{lq}$ and $i^e_{ld}$ are extracted by LPFs 164 and 166, resulting in values corresponding to the magnitude of the harmonic load current. The LPFs 164 and 166 may be implemented using the switched capacitor LPF illustrated in FIG. 11, or any other known LPF. A value corresponding to the magnitude of the selected harmonic component of load current is calculated by taking the square root of the sum of the squares of the outputs of the LPFs 164 and 166. Conventional amplifier circuits may be used to implement the squaring functions 167 and 168, the sum 170, and the square root function 172. Alternatively, and preferably, available integrated circuits components may be used to implement some of these functions. For example, the squaring 167 and 168 and square root 172 functions may be implemented using integrated circuits such as the MLT04 Analog Multiplier made by Analog Devices or the 4302 Multifunction Converter made by Burr-Brown. Note that since the relative difference between the magnitudes of the load and filter currents at the selected harmonic frequencies are used to generate the inductance command signal $L_{cmd}$, the square root function 172 may preferably be eliminated, as indicated by alternative connection 173. Proper normalization of the resulting magnitude value difference may be performed by the PI controller 160.

Preferably, the load harmonic current is limited by a magnitude limiter 174. The load harmonic current magnitude limiter 174 achieves two functions by adjusting the active inductance value $L_{cmd}$ generated by the PI controller 160. As its first function, it limits the maximum harmonic current in the filter to its designed value, and thus prevents overloading. Harmonic currents due to ambient harmonic loads and supply voltage distortions are thereby treated as disturbances and rejected into the supply, rather than filtered by the hybrid filter 30. Without the limiter 174, these ambient harmonic current distortions could cause the passive and active filter components to overload as the filter attempts to compensate for them. Harmonic standards, such as IEEE 519, specify individual harmonic current limits depending on the short circuit ratio (SCR) at the point of common coupling (PCC) between the load 32 and source 33. As its second function, the load harmonic current magnitude limiter 174 may be set to generate an $L_{cmd}$ value that meets the harmonic current standard limits, rather than to completely eliminate all harmonic supply current distortion at a desired harmonic frequency. This, in effect, allows controlled injection of load harmonic currents into the supply and results in a lower required active filter rating and cost. Further, it enables the use of simpler passive filters, such as a power factor correction capacitor, by implicitly achieving the equivalent function of a modified SRF based controller. The current magnitude limiter 174 may be implemented in analog or digital circuitry in a conventional manner. For example, the magnitude limiter 174 may include a look-up table loaded to output a current value that will result in meeting the IEEE 519 harmonic standard in response to an inputed load current harmonic value. This implementation may be performed using a digital signal processor (DSP).

The magnitude of the harmonic load current, as limited by the magnitude limiter 174, is combined with the magnitude of the harmonic filter current, for the same harmonic frequency, at a summing junction 176. The magnitude of the harmonic filter current is derived from the synchronously rotating two phase filter current quantities $i^e_{fsd}$ and $i^e_{fsq}$ that have been filtered by low pass filters 130 and 132 to extract the DC component there from. As described earlier, the DC component of the rotating two phase reference frame filter current quantities corresponds to the filter current at the selected harmonic frequency, in this case, the $5^{th}$ harmonic. The magnitude of the $5^{th}$ harmonic filter current is determined by taking the square root of the sum of squares of the DC quantities $i^e_{fsd}$ and $i^e_{fsq}$ from the low pass filters 130 and 132. The squaring functions 178 and 180, and the square root function 182 may preferably be implemented using the integrated circuits described above. As described above, the square root function 182 may preferably be eliminated, as illustrated by alternative connection 183. The summing junction 184 may be implemented in a conventional manner using an amplifier analog circuit.

The value corresponding to the magnitude of the harmonic filter current is subtracted from the value corresponding to the magnitude of the load harmonic current at the summing junction 176. The summing junction 176 may be implemented in a conventional manner using an analog amplifier circuit. The difference between the load and filter harmonic current magnitude values is provided to the PI controller 160. The normalized PI controller 160 generates the active inductance command signal $L_{cmd5}$ necessary to achieve the intended functions of harmonic compensation and filter current limiting due to ambient harmonic loads and supply voltage harmonic distortions. The active inductance command signal $L_{cmd5}$ output of the PI controller 160 is multiplied by the selected frequency $\omega_5$ at junction 185, and fed into the SRF controller 70 at junctions 140 and 142, as described above. Thus, the SRF controller 70, including the inductance command signal generator 73, provides the rotating two phase inverter voltage reference signal values, that are converted to three phase active filter inverter voltage command signals by the two phase to three phase synchronous reference frame transformer 150, to control the voltage source inverter 40, thereby to synthesize active inductor voltages $V_a$, $V_b$, $V_c$, representing the dynamically variable inductance of the hybrid filter 30.

A DC bus controller 79 is required to provide for the inverter losses from the DC bus 41. This is achieved by controlling the inverter 40 to generate a small fundamental voltage in the DC bus in phase with the fundamental passive filter reactive current. This ensures that a real power flow to charge the DC bus capacitor 41 occurs only at the fundamental frequency, and not at harmonic frequencies, to avoid supply-passive filter interaction, and supply current distortion. Real power flow may be provided in either direction, to charge or discharge the DC bus capacitor 41. The DC bus controller 79 is preferably an SRF based controller operating from the fundamental frequency of the filter current. The three phase filter currents $i_{fa}$, $i_{fb}$, and $i_{fc}$ are transformed to a two phase rotating reference frame (at the fundamental frequency, n=1) by a three phase to two phase SRF transformer 186. The three phase to two phase SRF transformer 186 may be implemented as described above, and employs $\sin\theta$ and $\cos\theta$ unit vectors, at the fundamental frequency, as derived from the PLL 80 and look-up table 81. The DC component of the synchronously rotating two phase reference frame filter current corresponds to the filter current at the fundamental frequency, and is extracted by low pass filters 188 and 190, which may be implemented in the manner described earlier with respect to FIG. 11. The voltage $V_{dc}$ on the DC bus 41 is measured, in a conventional manner, and filtered by a low pass filter 192, to remove any high frequency disturbance or noise. The measured and filtered DC bus voltage is then subtracted from a DC bus reference voltage signal $V^*_{dc}$ at a summing junction 194. The DC bus reference voltage signal $V^*_{dc}$ represents the desired steady state DC bus voltage. The difference between the actual and desired DC bus voltage signals is then applied to a proportional-integral (PI) controller 196. PI controller 196 in turn, generates a DC voltage command signal that is multiplied with the filter current at the fundamental frequency, as provided by LPFs 188 and 190, at multiplying junctions 198 and 200. The resulting synchronously rotating two phase DC bus control voltage command signals are transformed by a two phase to three phase SRF transformer 202 into DC bus control inverter voltage command signals for the fundamental frequency. These DC bus control inverter voltage command signals are added to the active filter inverter voltage command signals from the SRF controller 70 for the selected harmonic compensation frequency at the summing junctions 72, before the voltage commands are applied to the PWM modulator voltage source inverter 40.

As mentioned above, an SRF controller implementation in accordance with the present invention may be used to synthesize different $L_{cmd}$ variable inductance values at multiple frequencies using a single inverter 40. For example, a separate SRF controller 70 and inductance command signal generator 73 may be used to develop inverter voltage commands to compensate for the $5^{th}$ and $7^{th}$ harmonic frequencies. These voltage command signals may then be combined, for example, at the summing junctions 72, with the voltage command signals for the DC bus controller 79 at the fundamental frequency, to super position the $5^{th}$ and $7^{th}$ $L_{cmd}$ active inductance values, that will then be synthesized by the inverter 40.

Figure 14:
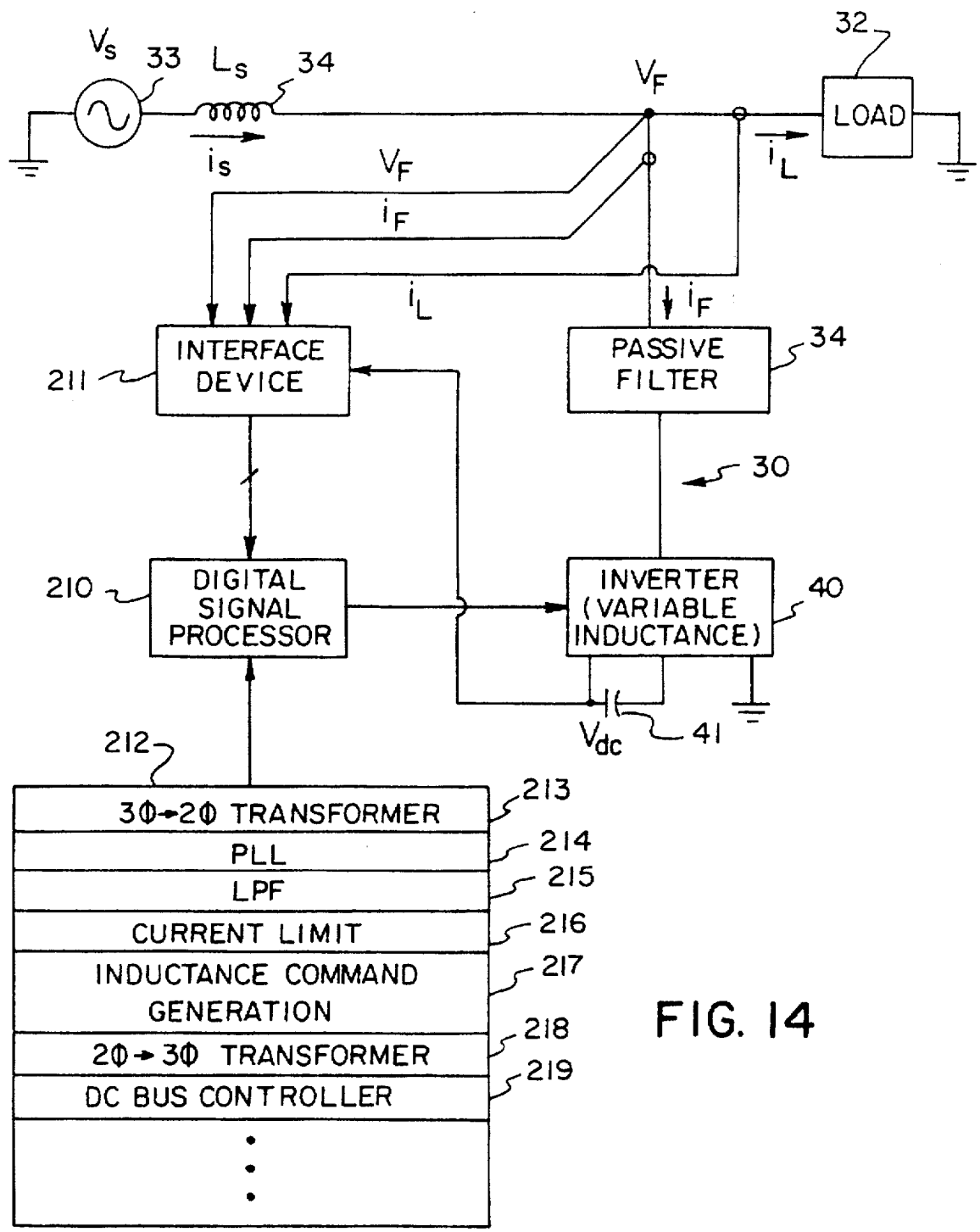
FIG. 14 is a block diagram of an alternative embodiment of a parallel hybrid active filter system in accordance with the present invention showing implementation of the active filter control system using a digital signal processor (DSP).

An alternative embodiment of a hybrid active filter system 30 in accordance with the present invention is shown in FIG. 14 to illustrate the fact that control of the active filter inverter 40 may be implemented using a digital signal processor (DSP) 210 or a similar type of digital control system, such as one employing a microprocessor. An interface device 211 may be used, for example, to convert the measured analog load and filter currents, and the filter terminal voltage $V_f$, to digital signals for use by the DSP 210. Note that the DSP 210 itself may include an analog to digital conversion capability. From the measured signals and a program stored in associated memory 212, the DSP generates the active filter inverter voltage command signals which are applied to the inverter 40 to generate dynamically varying inductances at selected frequencies to provide harmonic compensation. The program stored in memory 212 may allow the DSP 210 to implement all necessary inverter control operations. Functions to be implemented by the DSP 210, from the program stored in memory 212, include three-phase to two-phase transformation 213, phase lock loop 214 and low pass filtering 215 functions, current limiting 216 and inductance command signal generation 217, two-phase to three-phase transformation 218, and DC bus control inverter command signal generation 219. A single DSP 210 may be used to control the inverter 40 to generate dynamically variable inductances for filtering of multiple selected harmonic frequencies.

A distinguishing feature of the SRF controller implementation for a parallel hybrid active filter system in accordance with the present invention is its ability to selectively produce a desired active inductance $L_{cmd_n}$ based on voltages at multiple dominant harmonic frequencies, without affecting passive filter impedance characteristics at all other frequencies. The active filter inverter 40 can be controlled to emulate negative inductances at selected harmonic frequencies to provide notch filter characteristics for off-tuned and mis-tuned (due to component tolerances) passive filters. The active filter inverter 40 can also be controlled to provide multiple harmonic frequency tuning with a power factor correction capacitor passive filter. Similarly, the active filter 35 can emulate positive inductances at desired harmonic frequencies, to provide a current limiting function, or controlled load harmonic current injection into the supply, to prevent filter overloading. For the filter topology shown in FIG. 6, the active filter 60 can provide both $5^{th}$ and $7^{th}$ harmonic compensation voltages (or compensation for any other harmonics) to synthesize a multi-tuned filter. The active filter rating may be reduced by tuning the passive filter at the $5^{th}$ harmonic by inductor 66, with the active filter 60 providing harmonic filtering at the $7^{th}$ harmonic only. As will be discussed below, the inverter 60 generates a voltage only at the $7^{th}$ harmonic frequency, and zero active inductance voltage at the $5^{th}$ harmonic frequency. The control of the hybrid active filter 30 of the present invention is based on local measurements of filter and load currents, and does not require supply current measurement. This allows for only harmonic compensation, as opposed to harmonic isolation, and results in lower active filter rating and bandwidth requirements.

The SRF based variable inductance ($L_{cmd_n}$) controlled parallel hybrid active filter system of the present invention does not change the quality (Q) factor of the passive filter. This ensures damping of any oscillations due to sudden load changes, supply voltage distortions, and supply voltage sags or surges. This is an important distinction from previously proposed approaches, where the active filter is controlled to compensate for the resistive voltage drop of the passive filter and hence actively increases its quality factor. Previous approaches require DC energy storage due to real power transfers at harmonic frequencies, and result in large circulating harmonic passive filter currents.

The supply and filter current harmonics for the parallel hybrid active filter system topologies of the present invention shown in FIGS. 5 and 6 are given by equations 8–11, in terms of load current harmonics $I_{Lh}$ and supply voltage harmonics $V_{sh}$. $Z_s$, $Z_5$ and $Z_7$ represent supply, $5^{th}$, and $7^{th}$ harmonic passive filter impedances respectively.

$$I_{sh} = \frac{Z_5 Z_7}{Z_5 Z_7 + Z_5 Z_s + Z_7 Z_s} I_{Lh} + \frac{Z_5 + Z_7}{Z_5 Z_7 + Z_5 Z_s + Z_7 Z_s} V_{sh} \quad (8)$$

$$I_{5h} = -\frac{Z_7 Z_s}{Z_5 Z_7 + Z_5 Z_s + Z_7 Z_s} I_{Lh} + \frac{Z_7}{Z_5 Z_7 + Z_5 Z_s + Z_7 Z_s} V_{sh} \quad (9)$$

$$I_{7h} = \frac{Z_5 Z_s}{Z_5 Z_7 + Z_5 Z_s + Z_7 Z_s} I_{Lh} + \frac{Z_5}{Z_5 Z_7 + Z_5 Z_s + Z_7 Z_s} V_{sh} \quad (10)$$

$$I_{fh} = \frac{Z_f}{Z_s + Z_f} I_{Lh} + \frac{1}{Z_f + Z_s} V_{sh} \quad (11)$$

Parallel Hybrid Active Filter System Simulation Results

Simulation results are provided for the hybrid filter of the present invention connected to a typical thyristor front-end 325 kVA adjustable speed drive (ASD) load. The harmonic current spectrum at rated load is shown in Table 1. The nominal supply voltage is 480 V and has 3% of $5^{th}$ and $7^{th}$ voltage harmonics. The point of common coupling (PCC) transformer rating is 350 kVA, and three different transformer impedances of 2.7% (50 µH), 5.4% (100 µH) and 8.1% (150 µH) with corresponding short circuit ratios (SCRs) of 36.8, 18.4 and 9.2 are simulated.

TABLE 1

Harmonic current spectrum at Rated Load

| Harm No. | Load Current $I_L$ | |
|---|---|---|
| | Amps | % |
| 1 | 361.3 | 100.0% |
| 5 | 135.5 | 37.5% |
| 7 | 69.7 | 19.3% |
| 11 | 16.6 | 4.6% |
| 13 | 14.4 | 4.0% |
| 17 | 8.7 | 2.4% |
| 19 | 5.4 | 1.5% |
| 23 | 4.7 | 1.3% |
| 25 | 3.2 | 0.9% |
| THD | — | 43.4% |

TABLE 2

Supply Harmonic Current Spectrum for Case I(A) SCR = 36.8 (SCR > 20)

| Harm No. | IEEE 519 Standard | | Case 1-A | |
|---|---|---|---|---|
| | Amps | % | Amps | % |
| 1 | — | — | 359.0 | 85.3% |
| 5 | 29.5 | 7.0% | 17.0 | 4.03% |
| 7 | 29.5 | 7.0% | 0.3 | 0.08% |
| 11 | 14.7 | 3.5% | 10.0 | 2.36% |
| 13 | 14.7 | 3.5% | 8.7 | 2.06% |
| 17 | 10.5 | 2.5% | 5.4 | 1.28% |
| 19 | 10.5 | 2.5% | 2.3 | 0.54% |
| 23 | 4.2 | 1.0% | 2.6 | 0.62% |
| 25 | 4.2 | 1.0% | 1.4 | 0.33% |
| THD | — | 8.0% | — | 6.26% |

TABLE 3

Supply Harmonic Current Spectrum for Case I(B) SCR < 20

| Harm No. | IEEE 519 Standard Amps | % | Supply Current $I_s$ Amps | % |
|---|---|---|---|---|
| 1 | — | — | 333.0 | 79.1% |
| 5 | 16.8 | 4.0% | 76.0 | 18.05% |
| 7 | 16.8 | 4.0% | 22.8 | 5.42% |
| 11 | 8.4 | 2.0% | 7.1 | 1.70% |
| 13 | 8.4 | 2.0% | 6.4 | 1.52% |
| 17 | 6.3 | 1.5% | 4.1 | 0.97% |
| 19 | 6.3 | 1.5% | 2.4 | 0.57% |
| 23 | 2.5 | 0.6% | 2.0 | 0.48% |
| 25 | 2.5 | 0.6% | 2.0 | 0.48% |
| THD | — | 5.0% | — | 24.1% |

TABLE 4

Supply Harmonic Current Spectrum for Case II SCR < 20

| Harm No. | IEEE 519 Standard Amps | % | Supply Current Amps | % |
|---|---|---|---|---|
| 1 | — | — | 328.1 | 77.9% |
| 5 | 16.8 | 4.0% | 4.1 | 0.96% |
| 7 | 16.8 | 4.0% | 1.3 | 0.31% |
| 11 | 8.4 | 2.0% | 3.9 | 0.92% |
| 13 | 8.4 | 2.0% | 3.7 | 0.88% |
| 17 | 6.3 | 1.5% | 2.5 | 0.58% |
| 19 | 6.3 | 1.5% | 1.4 | 0.34% |
| 23 | 2.5 | 0.6% | 1.3 | 0.30% |
| 25 | 2.5 | 0.6% | 0.9 | 0.21% |
| THD | — | 5.0% | — | 2.31% |

Tables 2–4 give simulated results of the supply harmonic current spectrum and IEEE 519 limits for three cases, Case I (A), Case I(B) and Case II. The supply current base value is 421 A, which is calculated for the 350 kVA PCC transformer load. Three topologies of parallel hybrid active filter systems in accordance with the present invention are characterized by their passive filters, which are mis-tuned due to component tolerances of C+10% and L+10% (Case I(A)) and with supply voltage distortions (Case I(B)). The $5^{th}$ and $7^{th}$ passive filters provide 130 kVAR and 64 kVAR respectively. For Case II, a power factor correction capacitor $C_f$ of 220 kVAR is used as the passive filter. For a fourth case, case III, a power factor correction capacitor $C_f$ of 220 kVAR is used with passive inductor $L_f$ tuned to $5^{th}$ harmonic frequency. Tables 2–4 indicate that only $5^{th}$ and $7^{th}$ load current harmonics do not meet IEEE 519 limits and require harmonic compensation. Higher harmonics (>7th) meet IEEE 519 with the given passive filters for SCRs<20 and >20.

The topology of cases I(A) and I(B), with mis-tuned $5^{th}$ and $7^{th}$ passive filters, and with active filters in each filter branch, is shown in FIG. 5. This topology is simulated to demonstrate: (A) harmonic compensation capability with square-wave VSI under mis-tuned passive filter conditions and (B) the 'current limiting' function to prevent passive filter overloading with 5 kHz PWM VSI under 3% of $5^{th}$ and $7^{th}$ supply voltage harmonic distortions. Table 5 gives the tuned and mis-tuned $5^{th}$ and $7^{th}$ L-C component values.

TABLE 5

Passive filter tuned and mis-tuned component values for cases I(A) and I(B). $L_s = 100\ \mu H$, $R_s = 2 m\Omega$

| | $L_5$ | $C_5$ | $f_0$ | $L_7$ | $C_7$ | $f_0$ |
|---|---|---|---|---|---|---|
| tuned | 188 μH | 1500 μF | 5.0 | 194 μH | 740 μF | 7.0 |
| mistuned | 210 μH | 1650 μF | 4.5 | 215 μH | 810 μF | 6.35 |

Figure 15A:
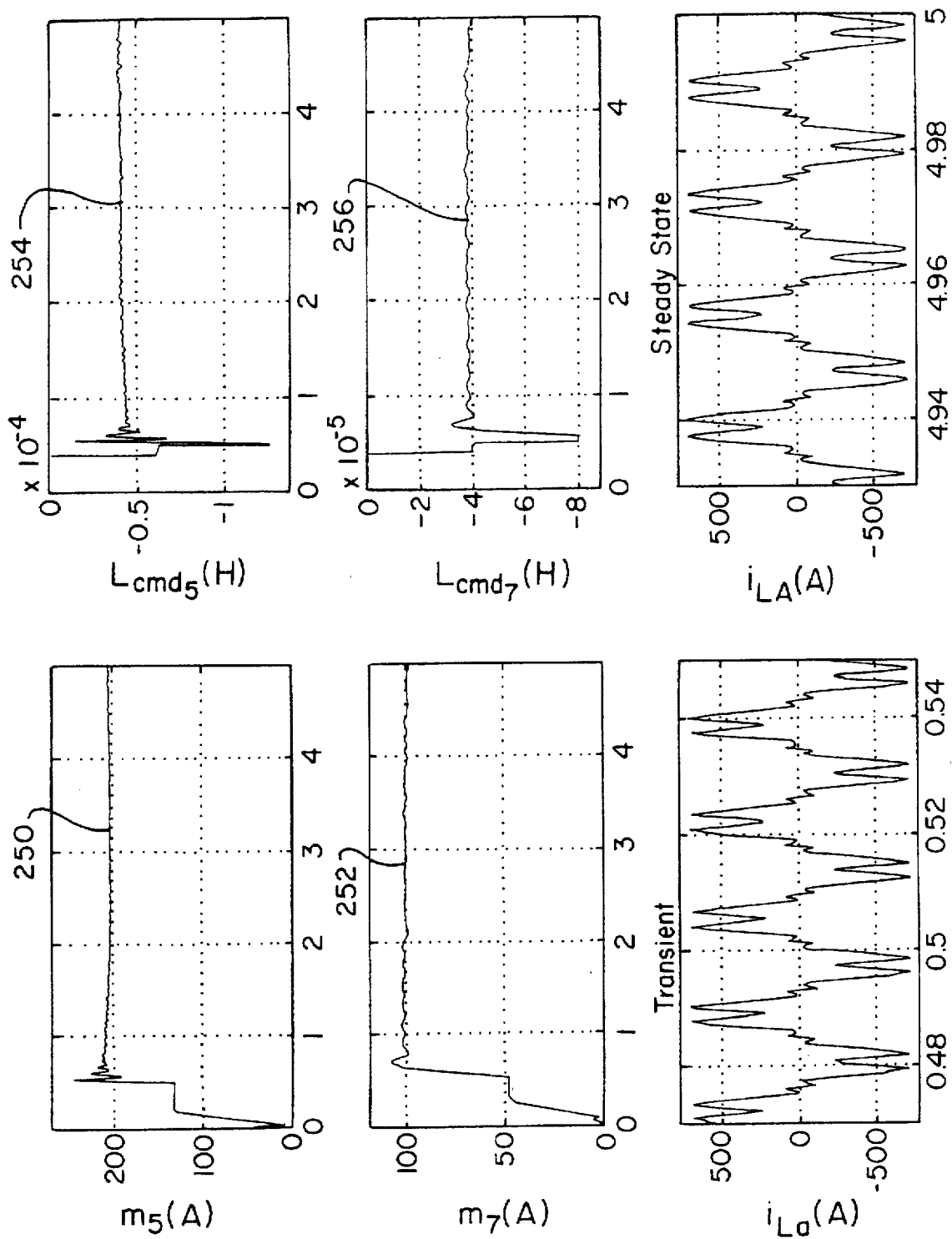
FIG. 15 shows graphs illustrating simulated transient and steady state inductances and currents for operation of a square-wave voltage source inverter hybrid active filter in accordance with the present invention under mis-tuned passive filter conditions.
Figure 15B:
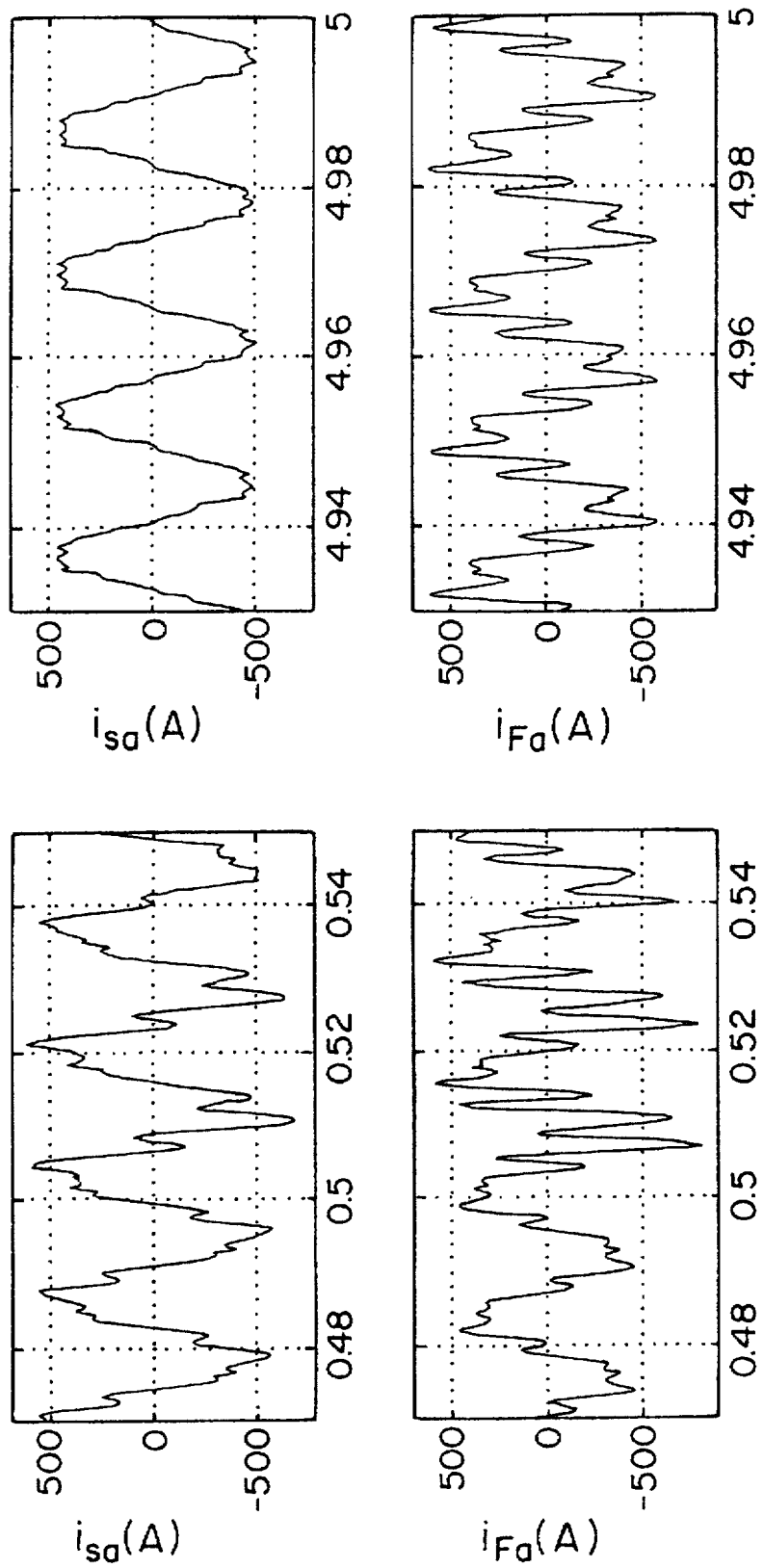
Figure 16A:
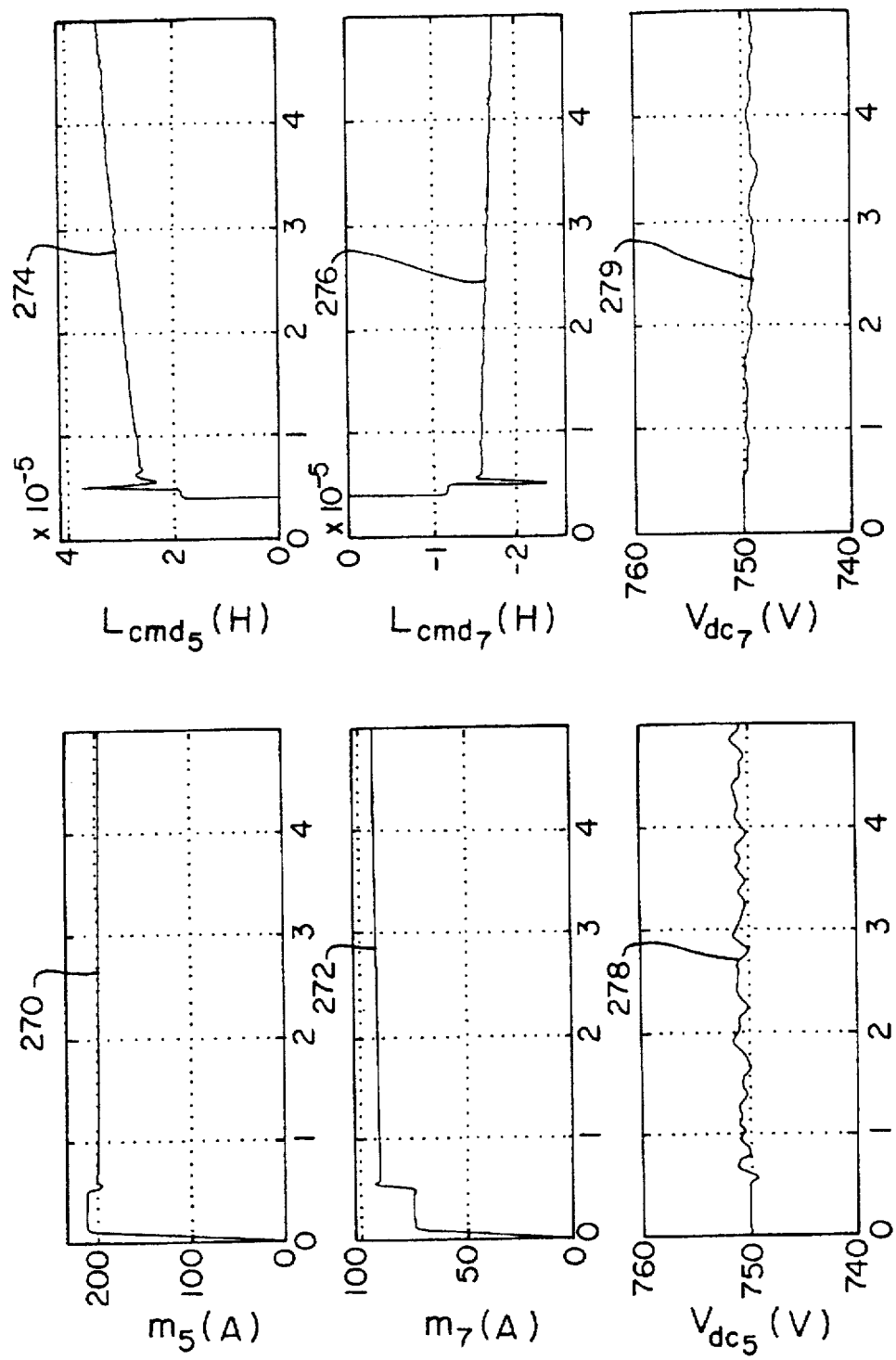
FIG. 16 shows graphs illustrating simulated transient and steady state inductances and currents for operation of a pulse width modulated voltage source inverter hybrid active filter with a DC bus controller in accordance with the present invention under ambient supply voltage harmonic and mis-tuned passive filter conditions.
Figure 16B:
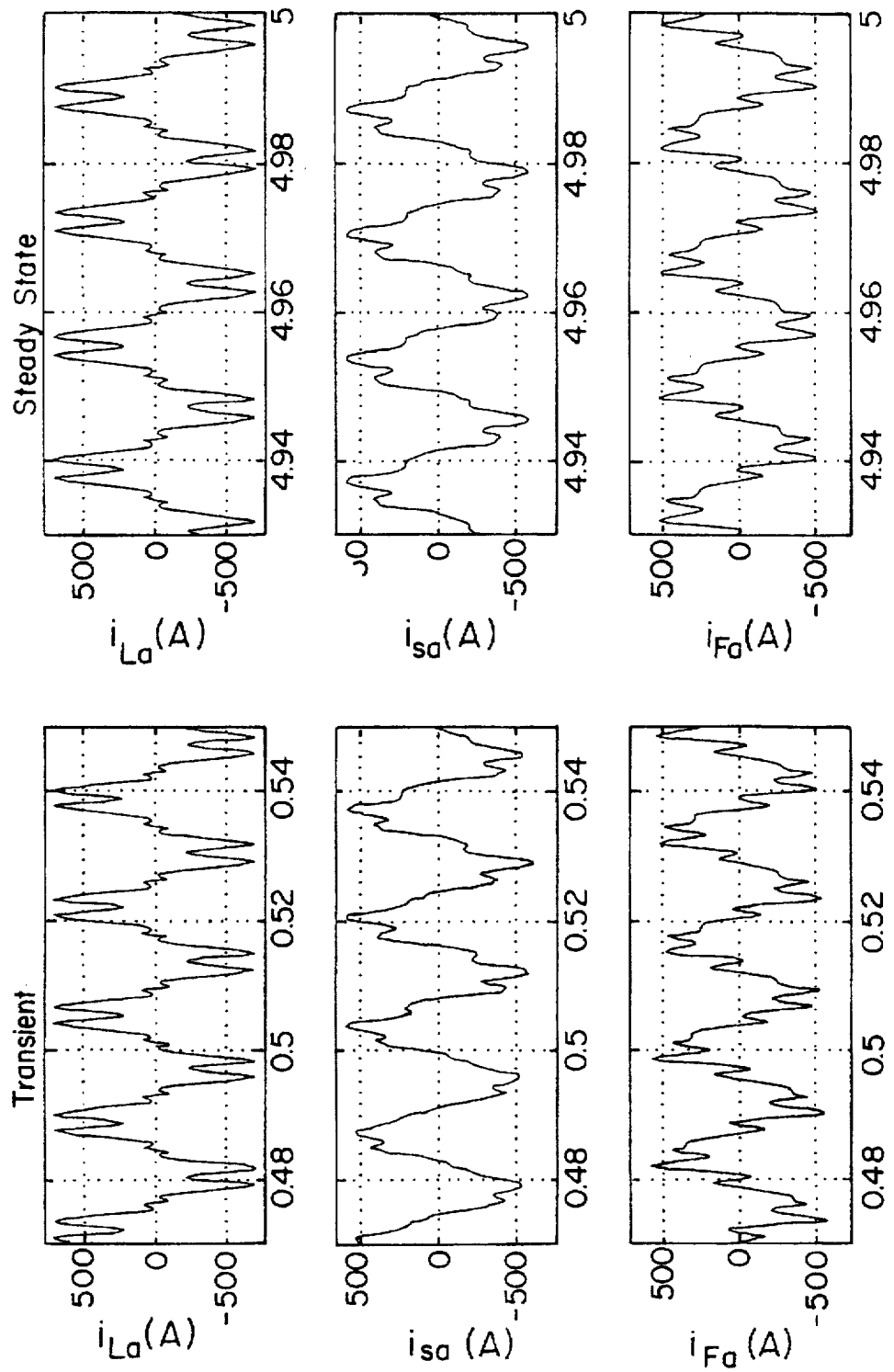

Simulation results for these cases are presented in FIGS. 15 and 16, and show the magnitudes of $5^{th}$ ($m_5$) and $7^{th}$ ($m_7$) passive filter currents, and the active inductance $L_{cmd_5}$ and $L_{cmd_7}$ values. The supply, load, and total filter currents are also shown under transient (left side plots) and steady state (right side plots) conditions. The list of variables used in the simulation plots are the following:

$m_5$: Magnitude of $5^{th}$ harmonic current in $5^{th}$ filter
$m_7$: Magnitude of $7^{th}$ harmonic current in $7^{th}$ filter
$i_{sa}$: source path current of phase a
$i_{la}$: load current of phase a
$i_{fa}$: total filter current ($i_{fa}=i_{fa5}+i_{fa7}$)

Passive filters are often mis-tuned due to component tolerances, out of specification inductors, or due to discrete inductor taps, which significantly reduces their harmonic compensation capability, especially for stiff supply systems. A parallel hybrid active filter in accordance with the present invention provides tuning for mis-tuned passive filters by actively inserting required $L_{cmd_5}$ and $L_{cmd_7}$ inductance values. The present invention thus eliminates the need for field re-tuning, and passive filter redesign costs, and provides an attractive filtering solution. FIG. 15 shows the transient and steady state simulation results for Case I(A) with $L_5$, $C_5$, $L_7$ and $C_7$ component tolerances of +10% for a stiff supply impedance of 2.7% (50 μH) and SCR of 36.8. The $5^{th}$ and $7^{th}$ passive filters are mistuned at 4.5 and 6.35, respectively. The active filter inverters, implemented by square-wave VSIs, are directly connected in series with the passive filters, without coupling transformers, and the nominal DC bus voltage is 750 V. Square-wave VSIs increase the practical viability and cost-effectiveness of this attractive scheme for harmonic compensation of large non-linear loads.

Before the active filters are started (t=0→0.5 seconds), the mis-tuned passive filters do not absorb all the $5^{th}$ and $7^{th}$ load current harmonics ($m_5$ and $m_7$), as shown by waveforms 250 and 252 in FIG. 15, and the supply current THD is 22.4%. The active filters are started at time t=0.5 seconds and provide tuning of the passive filters, as shown by increased $m_5$ and $m_7$ values equal to load current harmonics. Thus, the harmonic currents are drawn though the filter rather than being returned back to the voltage source. This is achieved by generating negative $L_{cmd_5}$ and $L_{cmd_7}$ inductances as shown by waveforms 254 and 256 in FIG. 15. The supply current THD is reduced to 6.26% (Table 2) and meets the IEEE 519 limit of 8.0%. The resulting required 2.2% kVA $5^{th}$ and 0.73% kVA $7^{th}$ active filter inverter ratings are cost-effective and imply 450 kVA and 150 kVA square-wave VSIs for harmonic compensation of a 20 MVA load.

FIG. 16 shows the system response for Case I(B) under 3% of $5^{th}$ and $7^{th}$ supply voltage harmonic distortions. The supply impedance is 5.4% (100 μH) with a SCR of 18.4. Note that the magnitude of the $5^{th}$ harmonic current in the $5^{th}$ harmonic passive filter, waveform 270 ($m_5$), during time t=0→0.5 seconds is ≈225 A. This is larger than the 193 A of $5^{th}$ harmonic load current. Note that the $7^{th}$ harmonic passive filter does not absorb the entire $7^{th}$ harmonic load current, waveform 272. The supply current THD is 14.7%. After the hybrid active filter is started, at time t=0.5 seconds, it alleviates the $5^{th}$ harmonic passive filter overloading by generating a positive active inductance $L_{cmd_5}$ value, waveform 274, which results in increased supply current THD of 24.1% (Table 3). Hence, it achieves disturbance rejection for the $5^{th}$ harmonic current under supply voltage harmonics, and will operate similarly under ambient harmonic loads. Note that the $7^{th}$ harmonic active filter generates a negative active inductance $L_{cmd_7}$ value, waveform 276, to absorb all the $7^{th}$ harmonic load current.

DC bus compensation is achieved by exchanging energy between the fundamental and harmonic components. Absence of real power flow, due to orthogonality of the $5^{th}$ and $7^{th}$ harmonic voltage and current, results in small DC bus voltage ripple, waveforms 278 and 279, with $C_{DC}$=2000 µF and a 1:20 coupling transformer ratio. The active filters in this case are implemented by a 5 kHz PWM VSI. The inverter ratings are slightly lower than Case I(A) (1.8% for $5^{th}$ harmonic inverter and 0.35% for $7^{th}$ harmonic inverter) due to the higher magnitude of the $7^{th}$ harmonic filter current due to the $7^{th}$ harmonic supply voltage at PCC.

Cases II and III demonstrate by simulation the use of a power factor correction capacitor as a passive filter in the hybrid filter of the present invention. In Case II, the filter inductor $L_f$ is the inverter output inductor and is not intended to provide tuning. In Case III, however, the inverter output inductor is used to provide tuning at the $5^{th}$ harmonic. In both cases, the supply impedance is 8.1% (150 µH) with a SCR of 9.2. The active filters are implemented by a 5 Khz PWM VSI, and use coupling transformers with 1:10 ratio. The nominal DC bus voltage is 750 V and $C_{DC}$=5000 µF. As described earlier, the inverter output filter inductor $L_f$ can be the leakage inductance of the coupling transformer.

The topology of the hybrid filter system simulated in Case II is shown in FIG. 6. The system parameters are shown in Table 6.

TABLE 6

| System parameters and passive filter component values for simulation Case II. | |
|---|---|
| $L_S$ = 150.0 µH | $R_S$ = 2.0 mΩ |
| $C_f$ = 2500.0 µF | $L_f$ = 70.0 µH |

Figure 17A:
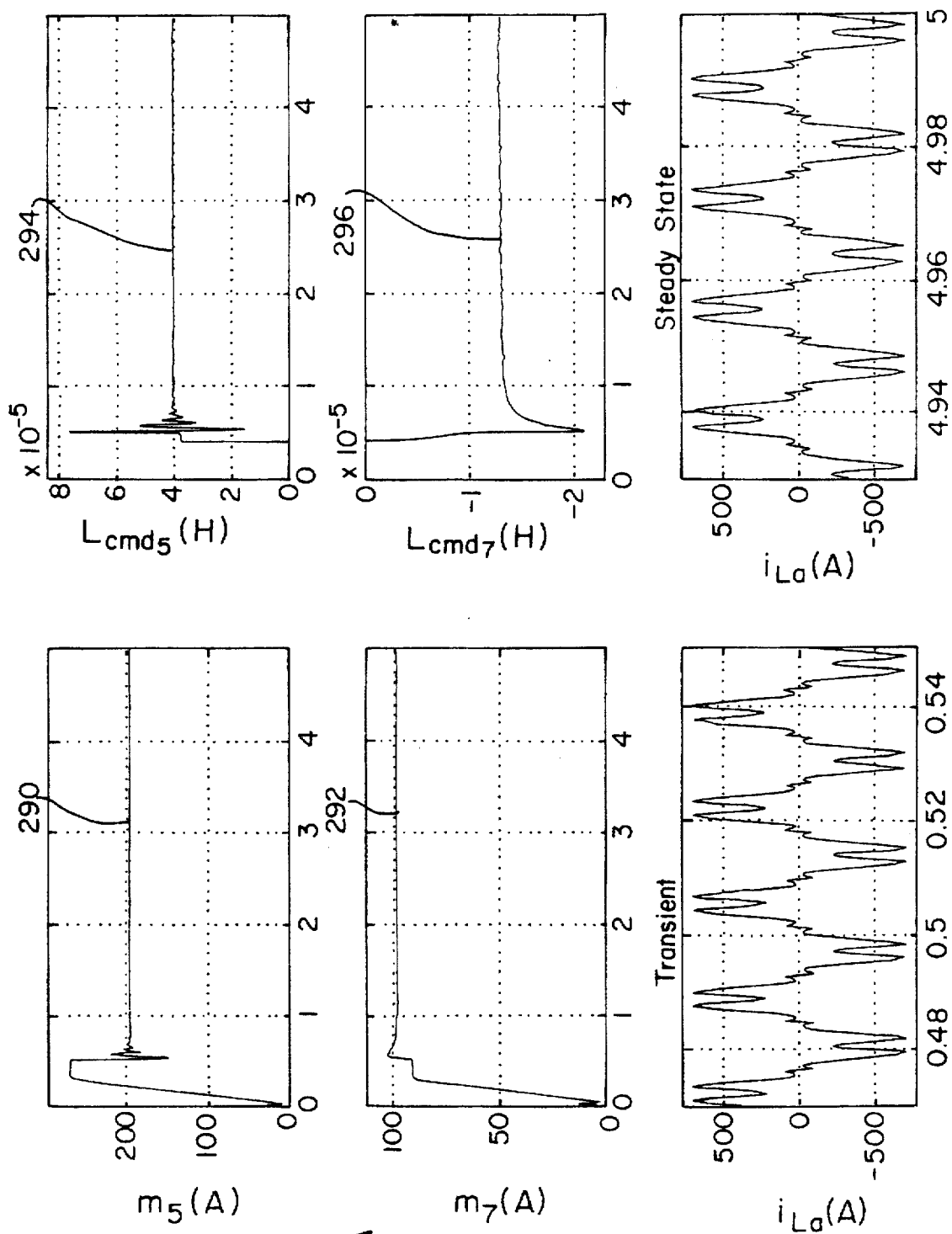
FIG. 17 shows graphs illustrating simulated transient and steady state inductances and currents for operation of a pulse width modulated voltage source inverter hybrid active filter in accordance with the present invention with a power factor correction capacitor passive filter.
Figure 17B:
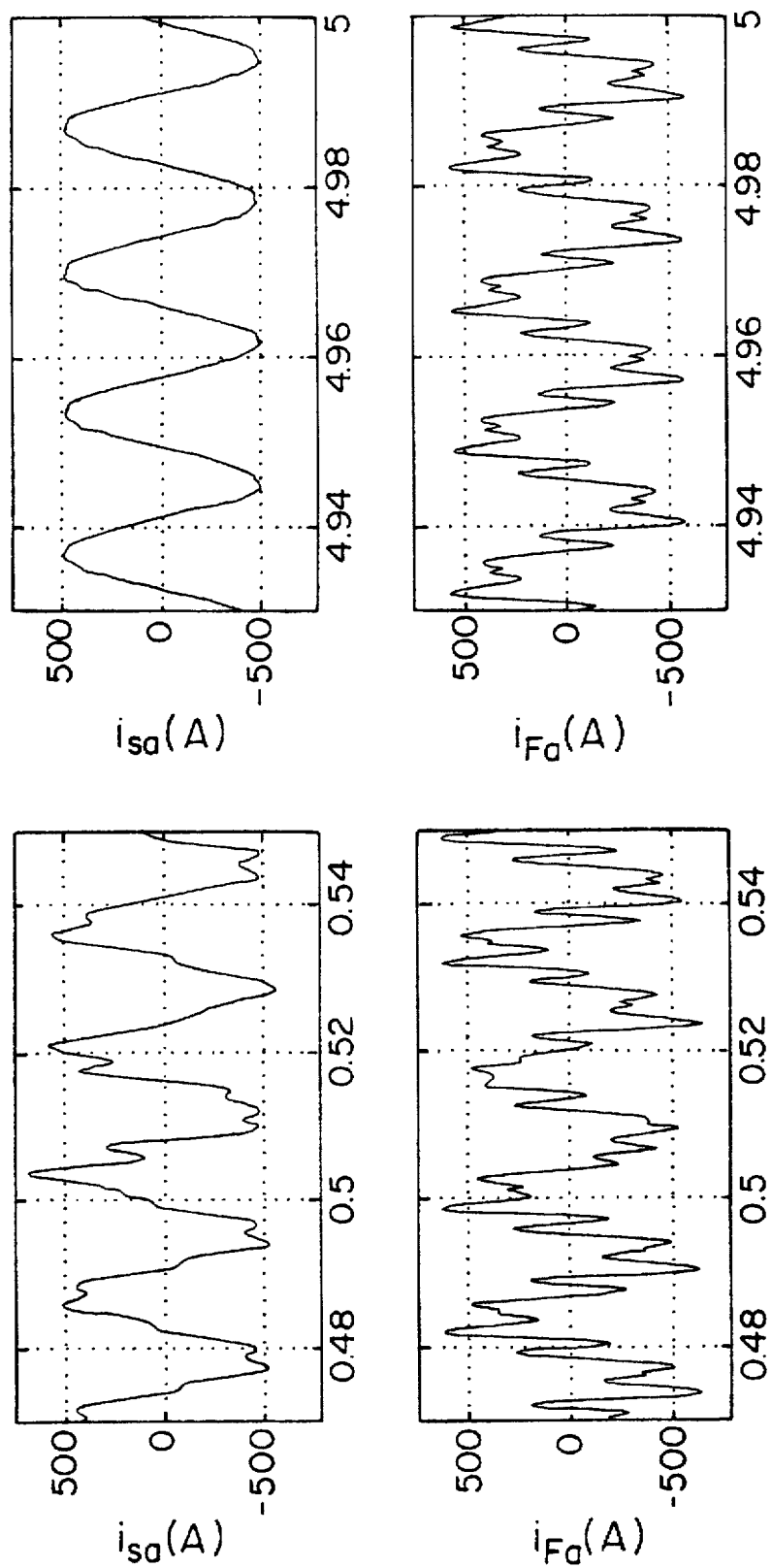

FIG. 17 shows the transient and steady state results for this case. Note that with $L_f$=70 µH, the passive filter is capacitive at the $5^{th}$ and inductive at the $7^{th}$ harmonic frequency.

Before the active filter is started, the magnitude of the filter current is larger than the load harmonic current, at the $5^{th}$ harmonic, waveform 290, and smaller at the $7^{th}$ harmonic, waveform 292, with a supply current THD of 15.3%. The active filter generates a positive $L_{cmd_5}$ inductance, waveform 294, to regulate the filter current equal to the load current at the $5^{th}$ harmonic, i.e., it provides current limiting. It generates a negative $L_{cmd_7}$ inductance, waveform 296, to provide tuning at the $7^{th}$ harmonic, and improves the overall harmonic compensation capability. $L_{cmd_5}$, waveform 294, converges to 42.7 µH ($\approx 1/(\omega^2_5 C_f) - L_f$) and $L_{cmd_7}$, waveform 296, converges to −12.3 µH ($1/(\omega^2_7 C_f) - L_f$) at steady state. After the active filter is started, the supply current THD is 2.31% and meets IEEE 519 harmonic limits (see Table 4). This demonstrates the SRF controller's ability to selectively produce active inductance $L_{cmd_n}$ based voltages at multiple harmonic frequencies by a single inverter.

Figure 18A:
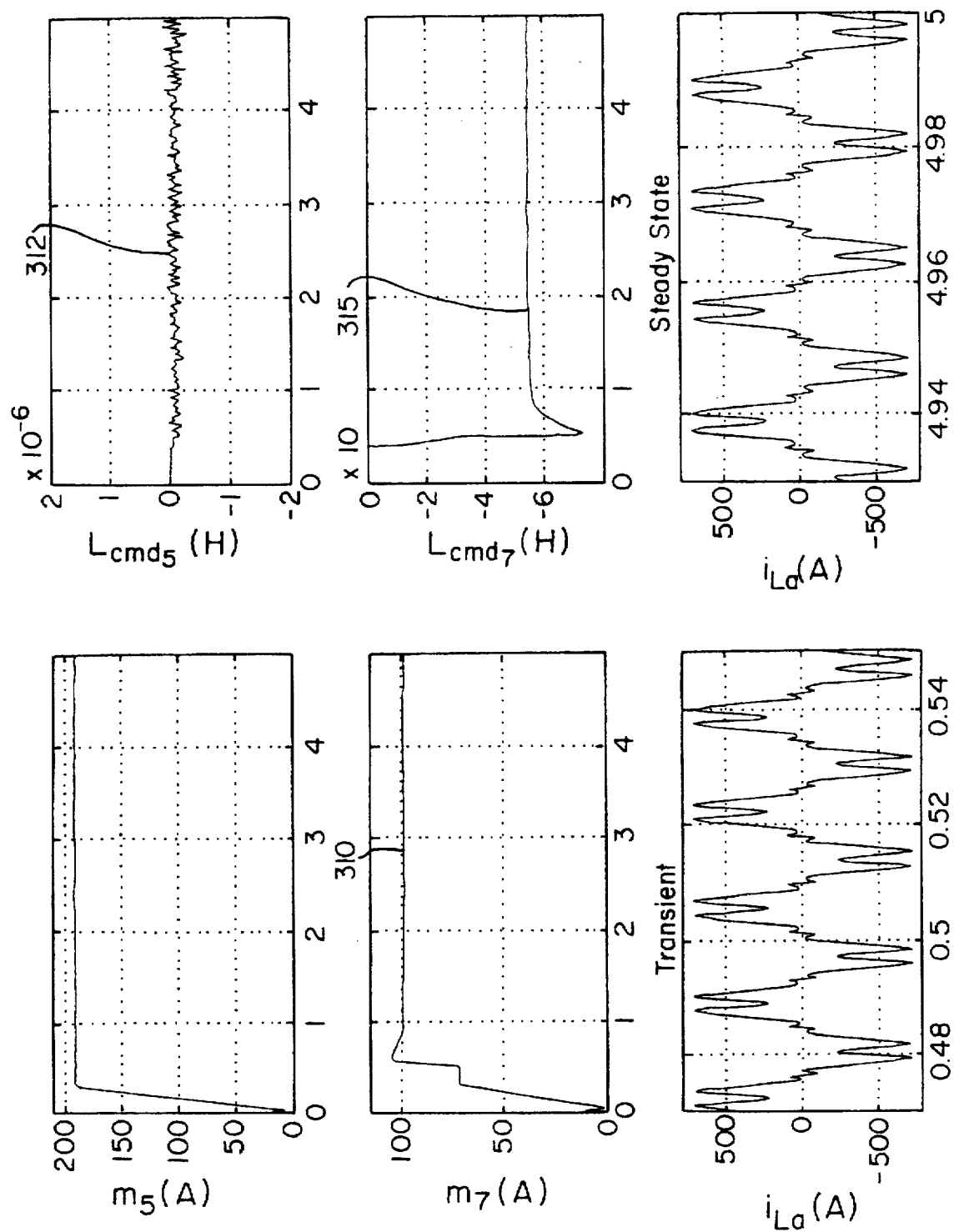
FIG. 18 shows graphs illustrating simulated transient and steady state inductances and currents for operation of a pulse width modulated voltage source inverter hybrid active filter in accordance with the present invention with a power factor correction capacitor and passive filter inductor tuned for the $5^{th}$ harmonic.
Figure 18B:
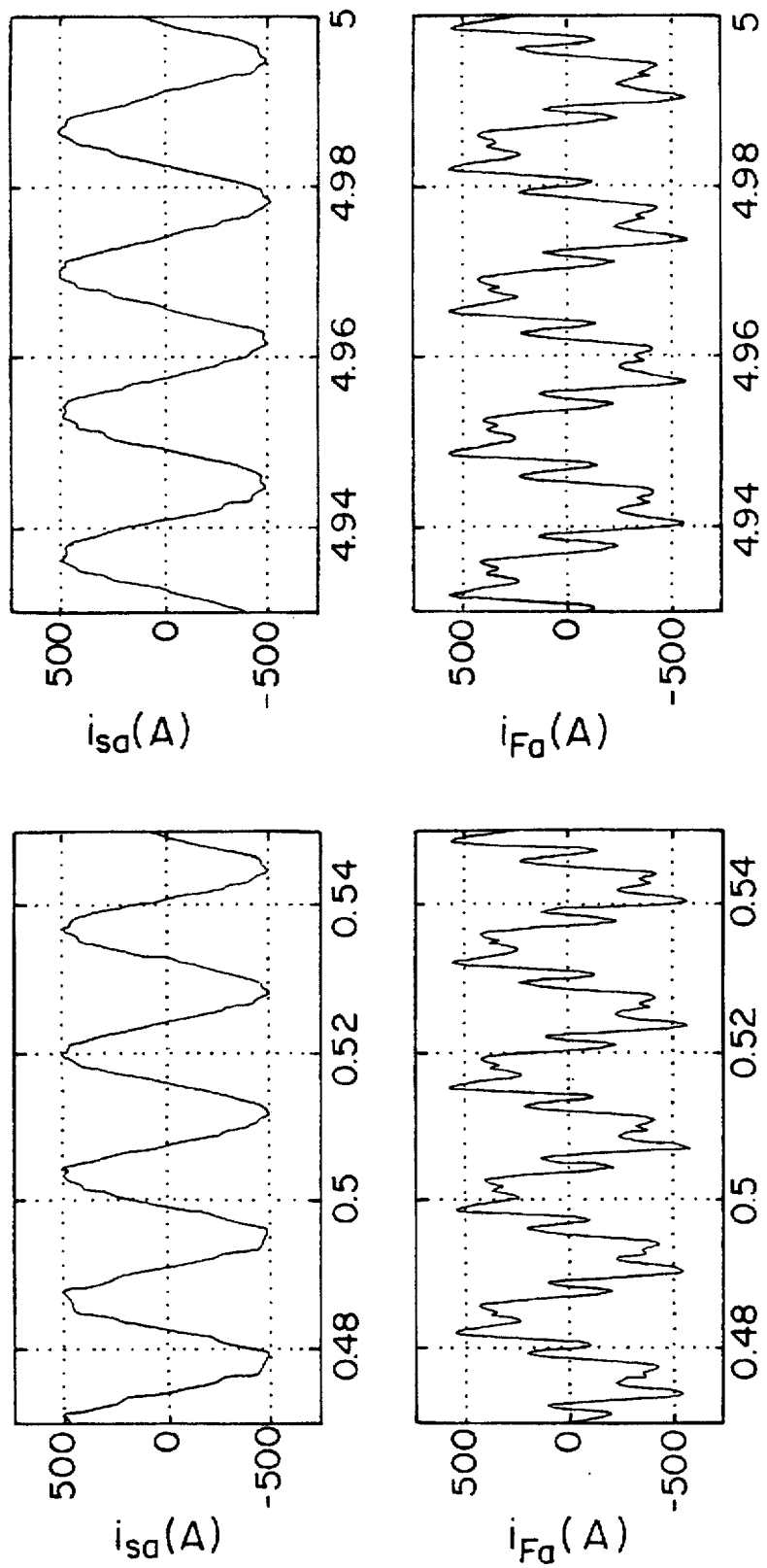

The topology of the hybrid filter system simulated in Case III is also shown by FIG. 6, with the same system parameters as given in Table 6, and $L_f$=110 µH to provide passive filter tuning at the $5^{th}$ harmonic. FIG. 18 shows transient (left side plots) and steady state (right side plots) simulation results. Note that with $L_f$=110 µH, the passive filter is inductive at the $7^{th}$ harmonic. This is shown by the smaller magnitude of the $7^{th}$ harmonic filter current, waveform 310, than the load current. The active filter generates zero $L_{cmd_5}$ inductance, waveform 312, and negative inductance at the $7^{th}$ harmonic, waveform 314, to provide tuning, $L_{cmd_7}$=−55 µH(($\approx 1/(\omega^2_7 C_f) - L_f$).

In the presence of supply voltage harmonics or ambient harmonic loads at the $5^{th}$ harmonic, the active filter of the present invention will generate a positive $L_{cmd_5}$ inductance to prevent overloading. The supply current THD reduces slightly from 4.0% to 2.3% after the active filter is started. This simulation shows dynamic regulation of the $L_{cmd_5}$ inductance value and $5^{th}$ harmonic inverter voltage to zero. Active filter inverter ratings for Case II and Case III are 3.5% and 3.2% of load KVa, respectively. The inverter ratings are similar due to the high supply impedance of 8.1% (150 µH). For lower supply impedance, the inverter rating for the tuned $5^{th}$ harmonic filter case will be lower.

It should be noted that the concept and method of synthesizing a dynamically varying inductance by SRF based control of a VSI in accordance with the present invention, is general, and has potential for applications other than harmonic compensation and filtering. Other applications include line voltage regulation, reactive power compensation, and harmonic isolation, etc. The controller of the present invention is simple, and can be implemented by analog or analog/digital hardware. The controller based parallel hybrid active filter system of the present invention provides an attractive solution for harmonic compensation of large non-linear and mixed linear and non-linear loads to meet harmonic standards, such as IEEE 519. It alleviates passive filter limitations, such as mis-tuning and overloading under ambient harmonic loads, and supply voltage distortions. The active filter of the present invention makes possible the use of a power factor correction capacitor as a passive filter to achieve multiple tuning for dominant harmonics. The present invention provides multi-tuning by selectively synthesizing multiple active inductances at specified dominant harmonic frequencies. Harmonic compensation by square-wave VSIs increases the cost-effectiveness of parallel hybrid active filters in accordance with the present invention for high power applications.

It is understood that the present invention is not limited to the applications or embodiments presented herein, but embraces all modified forms thereof that come within the scope of the following claims.

What is claimed is:

1. A parallel hybrid active filter for harmonic compensation of a non-linear load connected to a power supply, comprising:
   (a) a passive filter;
   (b) an active filter responsive to control signals connected in series with the passive filter such that the series combination of the passive and active filter is connectable in parallel with the load and power supply;
   (c) an active filter controller for generating control signals for controlling the active filter to generate a voltage in series with the passive filter which is orthogonal in phase to a current through the active filter at a selected harmonic frequency to synthesize a dynamically variable inductance at the selected harmonic frequency such that the passive and active filter in combination reduce an amount of harmonic current distortion produced by the load at the selected harmonic frequency that is returned to the power supply and reduce a harmonic voltage distortion at a filter terminal.

2. The parallel hybrid active filter of claim 1 including a coupling transformer to connect the active filter to the passive filter.

3. The parallel hybrid active filter of claim 1 including a passive filter for each phase of a three phase power supply and wherein the active filter is connected in series with each passive filter.

4. The parallel hybrid active filter of claim 1 wherein the active filter controller includes a digital signal processor.

5. The parallel hybrid active filter of claim 1 wherein the active filter controller includes means for controlling the active filter to limit an amount of current through the filter to a selected amount of current at the selected harmonic frequency.

6. The parallel hybrid active filter of claim 5 wherein the selected amount of current at the selected harmonic frequency is sufficient to reduce the amount of harmonic distortion to an amount specified by a recommended harmonic standard.

7. The parallel hybrid active filter of claim 1 wherein the passive filter includes a passive capacitor and a passive inductor.

8. The parallel hybrid active filter of claim 7 wherein the passive capacitor and inductor are tuned such that the passive filter reduces an amount of harmonic current distortion at a first harmonic frequency, and wherein the active filter controller controls the active filter to synthesize an active inductance at a selected harmonic frequency to reduce an amount of harmonic current distortion at a second harmonic frequency.

9. The parallel hybrid active filter of claim 1 wherein the passive filter consists of a power factor correction capacitor.

10. The parallel hybrid active filter of claim 1 wherein the active filter controller controls the active filter to synthesize active inductances at more than one frequency to reduce an amount of harmonic current distortion at more than one harmonic frequency simultaneously.

11. The parallel hybrid active filter of claim 1 wherein the active filter includes a voltage source inverter that synthesizes the dynamically variable inductance at the selected frequency in response to active filter inverter voltage command signals from the active filter controller.

12. The parallel hybrid active filter of claim 11 wherein the voltage source inverter is of a type selected from the group of voltage source inverters consisting of pulse width modulation inverters, square wave inverters, and multiple single phase inverters.

13. The parallel hybrid active filter of claim 11 wherein the active filter controller is a synchronous reference frame based controller including means for generating an active inductance command signal that defines an amount of variable inductance at a selected frequency, and means for generating the active filter inverter voltage command signals for controlling the inverter to synthesize the dynamically variable inductance in response to the active inductance command signals.

14. The parallel hybrid active filter of claim 13 wherein the inverter includes a DC bus capacitor and including a DC bus controller for controlling the inverter to provide bi-directional flow of real power to the DC bus capacitor to maintain a voltage on the DC bus capacitor.

15. A parallel hybrid active filter for harmonic compensation of a non-linear load connected to a power supply, comprising:

(a) a passive filter;
(b) an active filter including a voltage source inverter responsive to control signals connected in series with the passive filter such that the series combination of the passive and active filter is connectable in parallel with the load and power supply;
(c) a synchronous referenced frame based active filter controller for generating control signals for controlling the active filter to generate a voltage in series with the passive filter to synthesize a dynamically variable inductance at a selected harmonic frequency such that the passive and active filter in combination reduce an amount of harmonic current distortion produced by the load at the selected harmonic frequency that is returned to the power supply and reduce a harmonic voltage distortion at a filter terminal, including means for generating active inductance command signals that define an amount of variable inductance at the selected harmonic frequency based upon a difference between a signal corresponding to a magnitude of a load current at the selected harmonic frequency and a signal corresponding to a magnitude of a current through the hybrid filter at the selected harmonic frequency, and means for generating active filter inverter voltage command signals for controlling the inverter to synthesize the dynamically variable inductance in response to the active inductance command signals.

16. The parallel hybrid active filter of claim 15 wherein the means for generating the active inductance command signal includes means for limiting the signal corresponding to the magnitude of the load current at the selected harmonic frequency that is used to generate the active inductance command signal to thereby generate an active inductance command signal that will cause the active filter controller to control the active filter to limit a current through the active filter to a selected amount of current at the selected harmonic frequency.

17. A parallel hybrid active filter for harmonic compensation of a non-linear load connected to a power supply, comprising:

(a) a passive filter;
(b) an active filter including a voltage source inverter responsive to control signals connected in series with the passive filter such that the series combination of the passive and active filter is connectable in parallel with the load and power supply;
(c) a synchronous reference frame based active filter controller for generating control signals for controlling the active filter to generate a voltage in series with the passive filter to synthesize a dynamically variable inductance at a selected harmonic frequency such that the passive and active filter in combination reduce an amount of harmonic current distortion produced by the load at the selected harmonic frequency that is returned to the power supply and reduce a harmonic voltage distortion at a filter terminal, including means for generating an active inductance command signal that defines an amount of variable inductance at the selected harmonic frequency and means for generating active filter inverter voltage command signals including means for generating a signal representative of the derivative of a current through the hybrid filter at the selected harmonic frequency, and for multiplying the active inductance command signal and the signal representative of the derivative of the current through the hybrid filter at the selected harmonic frequency to produce an active inductor voltage command signal that is used to generate the active filter inverter voltage command signals.

18. The parallel hybrid active filter of claim 17 wherein the means for generating the signal representative of the derivative of a current through the hybrid filter at the selected harmonic frequency includes means for interchanging signals representing the filter current at the selected harmonic frequency in a synchronously rotating two phase d q reference frame and for multiplying the d q signals by constants of equal magnitude and opposite sign to rotate the d q signals by 90°, and for multiplying the interchanged signals by the selected harmonic frequency.

19. A parallel hybrid active filter for harmonic compensation of a non-linear load connected to a power supply, comprising:

(a) a passive filter;

(b) an active filter responsive to control signals including a voltage source inverter that responds to active filter inverter voltage command signals and that is connected in series with the passive filter such that the series combination of the passive and active filter is connectable in parallel with the load and power supply;

(c) a synchronous reference frame based active filter controller for generating control signals including means for generating an active inductance command signal that defines an amount of variable inductance and means for generating active filter inverter voltage command signals in response to the active inductance command signal for controlling the active filter voltage source inverter to generate a voltage in series with the passive filter to synthesize a dynamically variable inductance at a selected harmonic frequency such that the passive and active filter in combination reduce an amount of harmonic current distortion produced by the load at the selected harmonic frequency that is returned to the power supply and reduce a harmonic voltage distortion at a filter terminal.

20. The parallel hybrid active filter of claim 19 wherein the voltage source inverter is of a type selected from the group of voltage source inverters consisting of pulse width modulation inverters, square wave inverters, and multiple single phase inverters.

21. The parallel hybrid active filter of claim 19 wherein the synchronous reference frame based controller includes a digital signal processor.

22. The parallel hybrid active filter of claim 19 wherein the passive filter includes a passive capacitor and a passive inductor.

23. The parallel hybrid active filter of claim 22 wherein the passive capacitor and inductor are tuned such that the passive filter reduces an amount of harmonic current distortion at a first harmonic frequency, and wherein the active filter controller controls the active filter to synthesize an active inductance at a selected frequency to reduce an amount of harmonic current distortion at a second harmonic frequency.

24. The parallel hybrid active filter of claim 19 wherein the passive filter consists of a power factor correction capacitor.

25. The parallel hybrid active filter of claim 19 wherein the active filter controller controls the active filter to synthesize an active inductance at more than one frequency to reduce an amount of harmonic current distortion at more than one harmonic frequency simultaneously.

26. The parallel hybrid active filter of claim 19 including a coupling transformer to connect the voltage source inverter to the passive filter.

27. The parallel hybrid active filter of claim 19 wherein the means for generating the active inductance command signal generates the active inductance command signal based upon a difference between a signal corresponding to a magnitude of a load current at the selected harmonic frequency and a signal corresponding to a magnitude of a current through the hybrid filter at the selected harmonic frequency.

28. The parallel hybrid active filter of claim 27 wherein the means for generating the active inductance command signal includes means for limiting the signal corresponding to the magnitude of the load current at the selected harmonic frequency that is used to generate the active inductance command signal to thereby adjust the value of the active inductance command signal such that the active filter inverter voltage command signals generated in response to the active inductance command signal control the active filter to limit an amount of current through the active filter to a selected amount of current at the selected harmonic frequency.

29. The parallel hybrid active filter of claim 19 wherein the means for generating the active filter inverter voltage command signals includes means for generating a signal representative of the derivative of a current through the hybrid filter at the selected harmonic frequency, and for multiplying the active inductance command signal and the signal representative of the derivative of the current through the hybrid filter at the selected harmonic frequency to produce an active inductor voltage command signal that is used to generate the active filter inverter voltage command signals.

30. The parallel hybrid active filter of claim 29 wherein the means for generating the signal representative of the derivative of a current through the hybrid filter at the selected harmonic frequency includes means for interchanging signals representing the filter current at the selected harmonic frequency in a synchronously rotating two phase d-q reference frame and for multiplying the d-q signals by constants of equal magnitude and opposite sign to rotate the d-q signals by 90°, and for multiplying the interchanged signals by the selected harmonic frequency.

31. A parallel hybrid active filter for harmonic compensation of a non-linear load connected to a power supply, comprising:

(a) a passive filter;

(b) an active filter including a voltage source inverter having a DC bus capacitor, responsive to control signals, and connected in series with the passive filter such that the series combination of the passive and active filter is connectable in parallel with the load and power supply;

(c) a synchronous reference frame based active filter controller for generating control signals for controlling the active filter to generate a voltage in series with the passive filter to synthesize a dynamically variable inductance at a selected harmonic frequency such that the passive and active filter in combination reduce an amount of harmonic current distortion produced by the load at the selected harmonic frequency that is returned to the power supply and reduce a harmonic voltage distortion at a filter terminal, including means for generating active inductance command signals that define an amount of variable inductance at the selected harmonic frequency, and means for generating active filter inverter voltage command signals for controlling the inverter to synthesize the dynamically variable inductance in response to the active inductance command signals;

29

(d) a synchronous reference frame based controller for controlling the inverter to provide bi-directional flow of real power to the DC bus capacitor to maintain a voltage on the DC bus capacitor, including means for generating DC bus controller inverter voltage command signals from a product of the current signal through the hybrid filter at the fundamental frequency and a DC bus voltage command signal derived from a difference between a measured DC bus voltage and a DC bus voltage reference signal; and (e) means for adding the DC bus controller inverter voltage command signals to the active filter inverter voltage command signals.

32. A parallel hybrid active filter for harmonic compensation of a non-linear load connected to a power supply, comprising:

(a) a passive filter;

(b) an active filter responsive to control signals including a voltage source inverter that responds to active filter inverter voltage command signals and that is connected in series with the passive filter such that the series combination of the passive and active filter is connectable in parallel with the load and power supply; and (c) a synchronous reference frame based active filter controller for generating control signals including means for generating an active inductance command signal that defines an amount of variable inductance, means for generating active filter inverter voltage command signals in response to the active inductance command signal for controlling the active filter voltage source inverter to generate a voltage in series with the passive filter to synthesize a dynamically variable inductance at a selected harmonic frequency such that the passive and active filter in combination reduce an amount of harmonic current distortion produced by the load at the selected harmonic frequency that is returned to the power supply and reduce a harmonic voltage distortion at a filter terminal, and means for adjusting the value of the active inductance command signal such that the active filter inverter voltage command signals generated in response to the active inductance command signal control the active filter to limit an amount of current through the filter to a selected amount of current at the selected harmonic frequency.

33. A parallel hybrid active filter for harmonic compensation of a non-linear load connected to a power supply, comprising:

(a) a passive filter;

(b) an active filter responsive to control signals including a voltage source inverter having a DC bus capacitor, which responds to active filter inverter voltage command signals, and that is connected in series with the passive filter such that the series combination of the passive and active filter is connectable in parallel with the load and power supply;

(c) a synchronous reference frame based active filter controller for generating control signals including means for generating an active inductance command signal that defines an amount of variable inductance and means for generating active filter inverter voltage command signals in response to the active inductance command signal for controlling the active filter voltage source inverter to generate a voltage in series with the passive filter to synthesize a dynamically variable inductance at a selected harmonic frequency such that the passive and active filter in combination reduce an

30 amount of harmonic current distortion produced by the load at the selected harmonic frequency that is returned to the power supply and reduce a harmonic voltage distortion at a filter terminal, including means for generating a signal representative of the derivative of a current through the hybrid filter at the selected harmonic frequency, and for multiplying the active inductance command signal and the signal representative of the derivative of the current through the hybrid filter at the selected harmonic frequency to produce an active inductor voltage command signal that is used to generate the active filter inverter voltage command signals; and (d) a DC bus controller for controlling the inverter to provide bi-directional flow of real power to the DC bus capacitor to maintain a voltage on the DC bus capacitor.

34. The parallel hybrid active filter of claim 33 wherein the DC bus controller is a synchronous reference frame based controller including means for generating DC bus controller inverter voltage command signals from a product of the current signal through the hybrid filter at a fundamental frequency and a DC bus voltage command signal derived from a difference between a measured DC bus voltage and a DC bus voltage reference signal, and for adding the DC bus controller inverter voltage command signals to the active filter inverter voltage command signals.

35. A method for providing harmonic compensation of a non-linear load connected to a power supply, comprising the steps of:

(a) connecting a passive filter in parallel with the load and power supply; and (b) generating a voltage in series with the passive filter which is orthogonal in phase to a current through the passive filter at a selected harmonic frequency to thereby synthesize a dynamically variable inductance at the selected harmonic frequency such that the passive filter and dynamically variable inductance in combination reduce an amount of harmonic current distortion produced by the load at the selected harmonic frequency that is returned to the power supply.

36. The method of claim 35 including the additional step of limiting an amount of current through the passive filter at the selected harmonic frequency to a selected amount of current.

37. The method of claim 36 wherein the selected amount of current is an amount sufficient to reduce the amount of harmonic distortion to an amount specified by a recommended harmonic standard.

38. The method of claim 35 wherein the passive filter includes a passive capacitor and a passive inductor and including the step of tuning the passive inductor and capacitor such that the passive filter reduces an amount of harmonic current distortion at a first harmonic frequency, and wherein the step of generating a voltage synthesizes an active inductance at a selected frequency to reduce an amount of harmonic current distortion at a second harmonic frequency.

39. The method of claim 35 including the step of generating voltages in series with the passive filter to synthesize an active inductance at more than one frequency to reduce an amount of harmonic current distortion at more than one harmonic frequency simultaneously.

40. A method for providing harmonic compensation of a non-linear load connected to a power supply, comprising the steps of:

(a) connecting a passive filter in parallel with the load and power supply; and (b) generating a voltage in series with the passive filter to synthesize a dynamically variable inductance at a selected harmonic frequency such that the passive filter and dynamically variable inductance in combination reduce an amount of harmonic current distortion produced by the load at the selected harmonic frequency that is returned to the power supply, including the steps of:

determining a current through the passive filter at the selected harmonic frequency in a rotating synchronous two phase d-q reference frame;

determining a filter current magnitude value corresponding to a magnitude of the current through the filter at the selected harmonic frequency in a rotating synchronous two phase d-q reference frame;

determining the current to a load at the selected harmonic frequency in a rotating synchronous two phase d-q reference frame;

determining a load current magnitude value corresponding to a magnitude of the current to the load at the selected harmonic frequency in a rotating synchronous two phase d-q reference frame;

generating an active inductance command signal that defines an amount of variable inductance at a selected frequency from the difference between the filter current magnitude value and the load current magnitude value;

generating a signal corresponding to the derivative of the current through the filter at the selected harmonic frequency;

multiplying the active inductance command signal by the signal corresponding to the derivative of the current through the filter at the selected harmonic frequency to form an inductor voltage command signal in the rotating synchronous two phase d-q reference frame; and converting the inductor voltage command signal from the rotating synchronous two phase reference frame to a three phase reference frame to form active filter inverter voltage commands for controlling an inverter to generate the voltage.

41. The method of claim 40 including the step of limiting the load current magnitude value that is used in the step of generating the active inductance command signal.

42. The method of claim 40 wherein the step of generating a signal corresponding to the derivative of the current through the filter at the selected harmonic frequency includes the steps of interchanging quantities representing the filter current at the selected harmonic frequency in the synchronously rotating two phase d-q reference frame and multiplying the d-q signals by constants of equal magnitude and opposite sign to rotate the signals by 90°, and multiplying the interchanged quantities by the selected harmonic frequency.

43. A method for controlling a voltage source inverter to synthesize a dynamically variable inductance in response to inverter voltage commands, comprising the steps of:

(a) determining a current through the inverter at a selected harmonic frequency in a rotating synchronous two phase d-q reference frame;

(b) generating an active inductance command that defines an amount of variable inductance;

(c) taking the derivative of the current through the inverter at the selected harmonic frequency;

(d) multiplying the active inductance command by the derivative of the current through the filter at the selected harmonic frequency to form an inductor voltage command in the rotating synchronous two phase d q reference frame; and (e) converting the inductance voltage command from the rotating synchronous two phase reference frame to a three phase reference frame to form the inverter voltage commands to control the inverter to synthesize the inductance.

44. The method of claim 43 wherein the step of taking the derivative of the current through the inverter at the selected harmonic frequency includes the steps of interchanging signals representing the inverter current at the selected harmonic frequency in the synchronously rotating two phase d q reference frame and multiplying the d q signals by constants of equal magnitude and opposite sign to rotate the signals by 90°, and multiplying the interchanged quantities by the selected harmonic frequency.

45. The method of claim 43 wherein the inverter includes a DC bus capacitor and including the additional step of controlling the inverter to provide bi-directional real power to the DC bus capacitor to maintain a voltage on the DC bus capacitor.

46. The method of claim 45 wherein the step of controlling the inverter to provide power to the DC bus capacitor includes the steps of:

(a) determining the current through the inverter at the fundamental frequency in a rotating synchronous two phase d q reference frame;

(b) determining a DC voltage command based on the difference between a DC bus reference voltage and a measured DC bus voltage level;

(c) multiplying the DC voltage command by the current through the inverter at the fundamental frequency to form a DC bus voltage command in the rotating synchronous two phase d-q reference frame;

(d) converting the DC bus voltage command from the two phase reference frame to a three phase reference frame to form DC bus control inverter voltage commands; and (e) adding the DC bus control inverter voltage commands to the inverter voltage commands.

* * * * *

UNITED STATES PATENT AND TRADEMARK OFFICE
CERTIFICATE OF CORRECTION

PATENT NO. : 5,757,099
DATED : May 26, 1998
INVENTOR(S) : Po-Tai Cheng, et al.

It is certified that error appears in the above—identified patent and that said Letters Patent is hereby corrected as shown below:

Column 1, Line 6 of the patent: "CR-4715-430620" be deleted and --N00014-95-1-1128-- be inserted in its place.

Signed and Sealed this

First Day of September, 1998

Attest:

BRUCE LEHMAN

Attesting Officer

Commissioner of Patents and Trademarks